US012712264B2

(12) United States Patent
Hung et al.

(10) Patent No.: US 12,712,264 B2
(45) Date of Patent: Aug. 18, 2026

(54) ANTENNA DEVICE

(71) Applicant: AUO Corporation, Hsinchu (TW)

(72) Inventors: Ching-Lang Hung, Hsinchu (TW); Chia-Wei Kuo, Hsinchu (TW)

(73) Assignee: AUO Corporation, Hsinchu (TW)

( * ) Notice: Subject to any disclaimer, the term of this patent is extended or adjusted under 35 U.S.C. 154(b) by 307 days.

(21) Appl. No.: 18/395,632

(22) Filed: Dec. 25, 2023

(65) Prior Publication Data

US 2025/0174892 A1 May 29, 2025

(30) Foreign Application Priority Data

Nov. 27, 2023 (TW) ................................ 112145759

(51) Int. Cl.
*H01Q 3/46* (2006.01)
*H01Q 9/04* (2006.01)

(52) U.S. Cl.
CPC ............ *H01Q 3/46* (2013.01); *H01Q 9/0407* (2013.01)

(58) Field of Classification Search
USPC .......................................................... 343/816
See application file for complete search history.

(56) References Cited

U.S. PATENT DOCUMENTS

| | | | | |
|---|---|---|---|---|
| 2018/0182556 | A1* | 6/2018 | Linn | H01Q 13/103 |
| 2020/0343633 | A1* | 10/2020 | Yasuo | H01Q 21/064 |
| 2021/0336312 | A1* | 10/2021 | Lu | H01P 1/18 |

FOREIGN PATENT DOCUMENTS

| | | | |
|---|---|---|---|
| CN | 113948869 | 1/2022 | |
| CN | 114336056 | 4/2022 | |
| TW | I795151 | 3/2023 | |
| WO | WO-2023140243 A1 * | 7/2023 | H01Q 1/48 |
| WO | WO-2023181614 A1 * | 9/2023 | H01Q 15/14 |

* cited by examiner

*Primary Examiner* — Dimary S Lopez Cruz
*Assistant Examiner* — Brandon Sean Woods
(74) *Attorney, Agent, or Firm* — JCIPRNET

(57) ABSTRACT

An antenna device includes an antenna array substrate. The antenna array substrate includes a first substrate, a second substrate, a liquid crystal layer and a plurality of antenna units. The liquid crystal layer is located between the first substrate and the second substrate. Each antenna unit includes at least four first antenna electrodes and a second antenna electrode. The first antenna electrodes are separated from each other and located above a first side of the first substrate near the liquid crystal layer. The second antenna electrode is located above a first side of the second substrate near the liquid crystal layer. The second antenna electrode is partially overlapping with the at least four first antenna electrodes in a normal direction of the top surface of the second substrate.

19 Claims, 23 Drawing Sheets

ANTENNA DEVICE

CROSS-REFERENCE TO RELATED APPLICATION

This application claims the priority benefit of Taiwan application serial no. 112145759, filed on Nov. 27, 2023. The entirety of the above-mentioned patent application is hereby incorporated by reference herein and made a part of specification.

BACKGROUND

Technical Field

This invention is related to an antenna device.

Description of Related Art

The application of wireless communication technology is ubiquitous in modem life. For example, smartphones usually have wireless communication technology systems such as a wireless wide area network (WWAN) system, a digital television (DTV) broadcasting system, a global positioning system (GPS), and a wireless local area network (WLAN) system, near field communication (NFC) system, a long term evolution (LTE) system and wireless personal network (WLPN) system, etc. In addition, in important cities or public spaces, a wireless local area network (LAN) environment has become a necessary facility, and many people even set up their own wireless LAN at home.

With the development of 5G technology, antenna devices are usually used to reorganize the signals from the base stations and transmit them in different directions to ensure that base station signals cover every corner. Therefore, improving the reflection effect and phase modulation capability of the antenna devices has become a major issue that needs to be solved in this field. This will help improve the coverage of base station signals and their ability to reach various locations.

SUMMARY

The present invention provides an antenna device with the advantages of high phase modulation amount and high reflection intensity for radiation signals.

At least one embodiment of the present invention provides an antenna device including an antenna array substrate. The antenna array substrate includes a first substrate, a second substrate, a liquid crystal layer and a plurality of antenna units. The liquid crystal layer is located between the first substrate and the second substrate. Each antenna unit includes at least four first antenna electrodes and a second antenna electrode. The at least four first antenna electrodes are separated from each other and located above a first side of the first substrate near the liquid crystal layer. The second antenna electrode is located above a first side of the second substrate near the liquid crystal layer. The second antenna electrode is overlapping with the at least four first antenna electrodes in a normal direction of a top surface of the second substrate.

Based on the above, the at least four first antenna electrodes are separated from each other and overlapping with the second antenna electrode. By overlapping multiple electrodes, the reflection intensity of antenna signals with different polarization directions can be enhanced, and a larger phase modulation amount can be provided.

DESCRIPTION OF THE EMBODIMENTS

Figure 1:
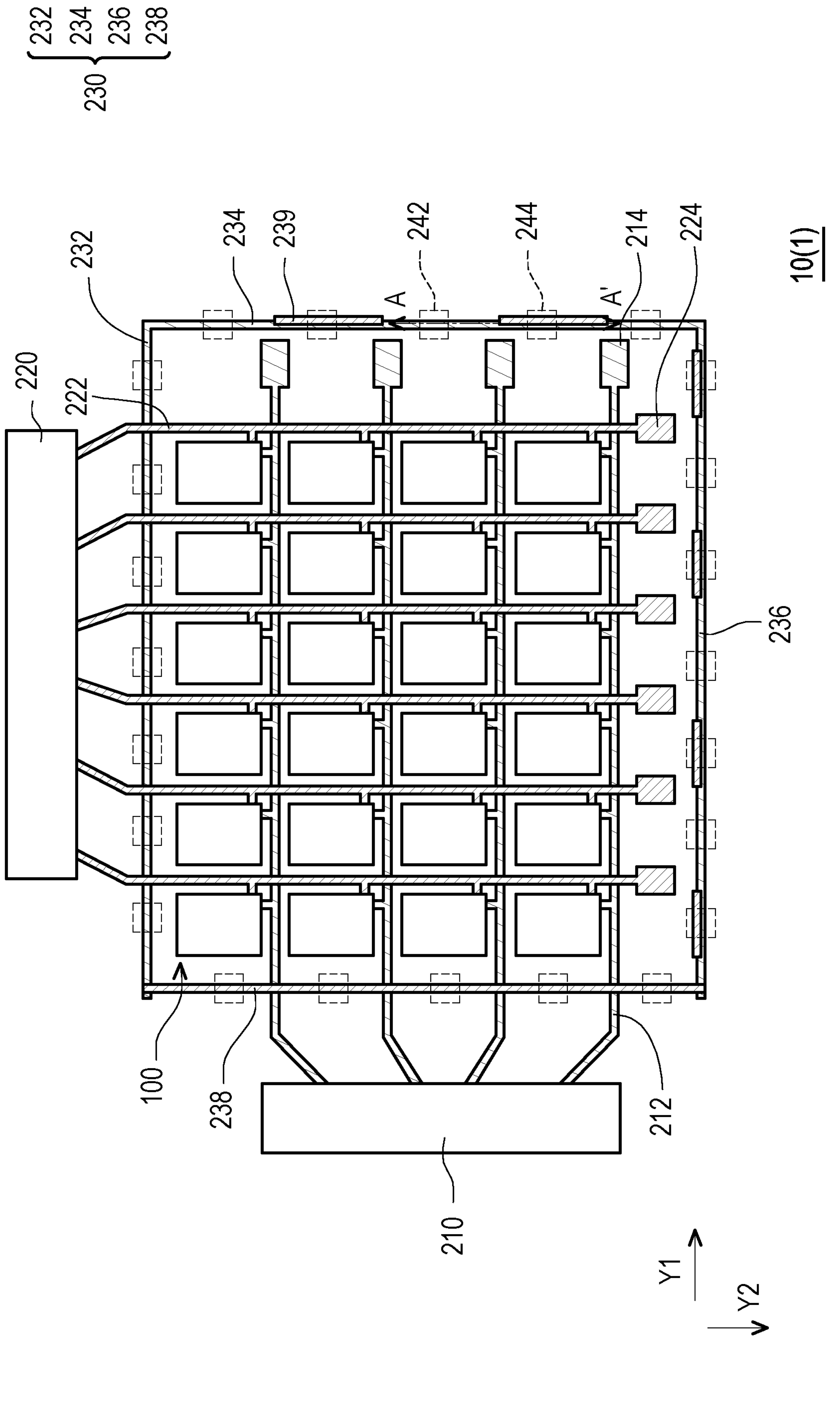
FIG. 1 is a schematic top view of an antenna device according to an embodiment of the present invention.
Figure 2A:
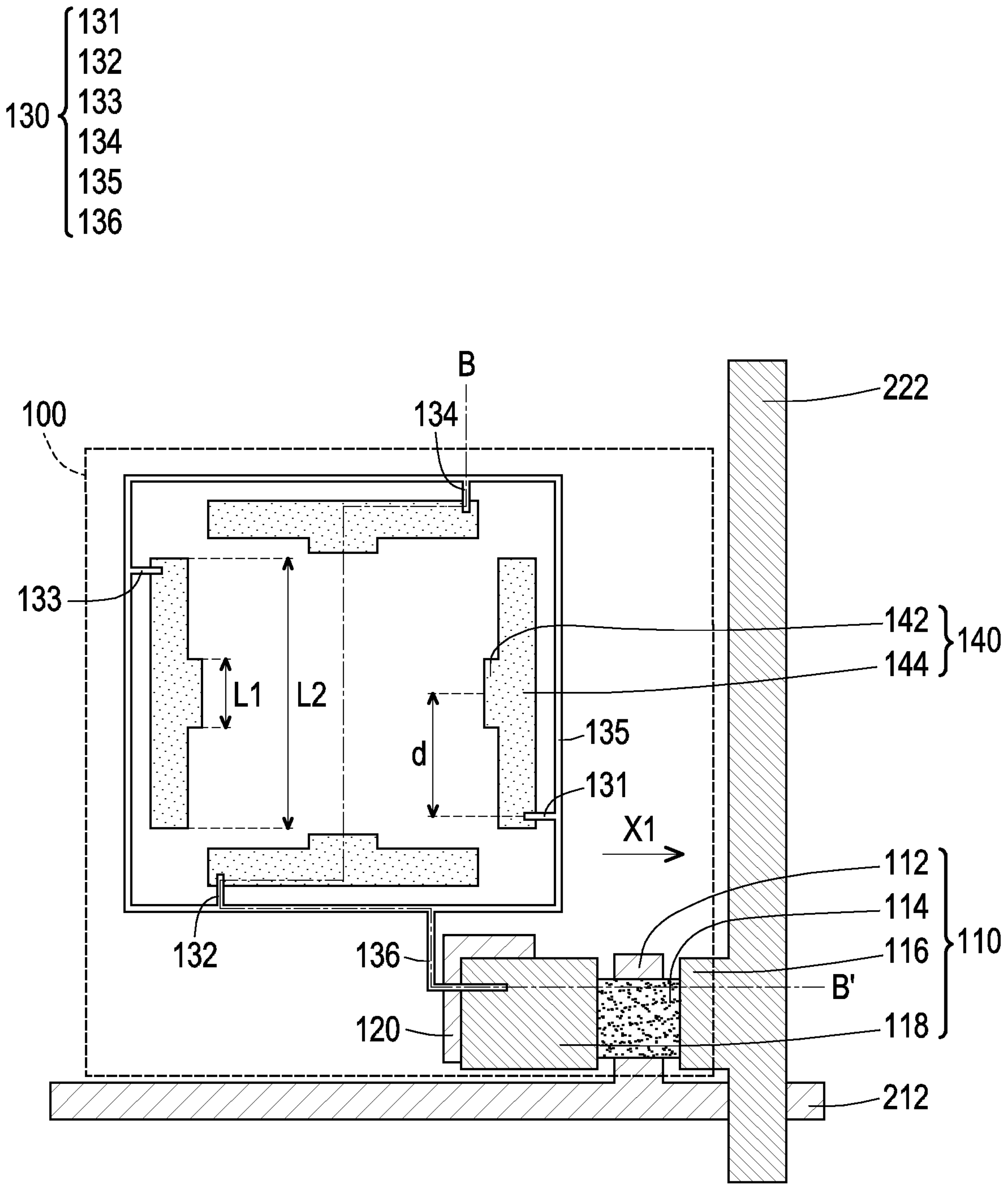
FIG. 2A and FIG. 2B are schematic top views of an antenna unit in the antenna device of FIG. 1.
Figure 2B:
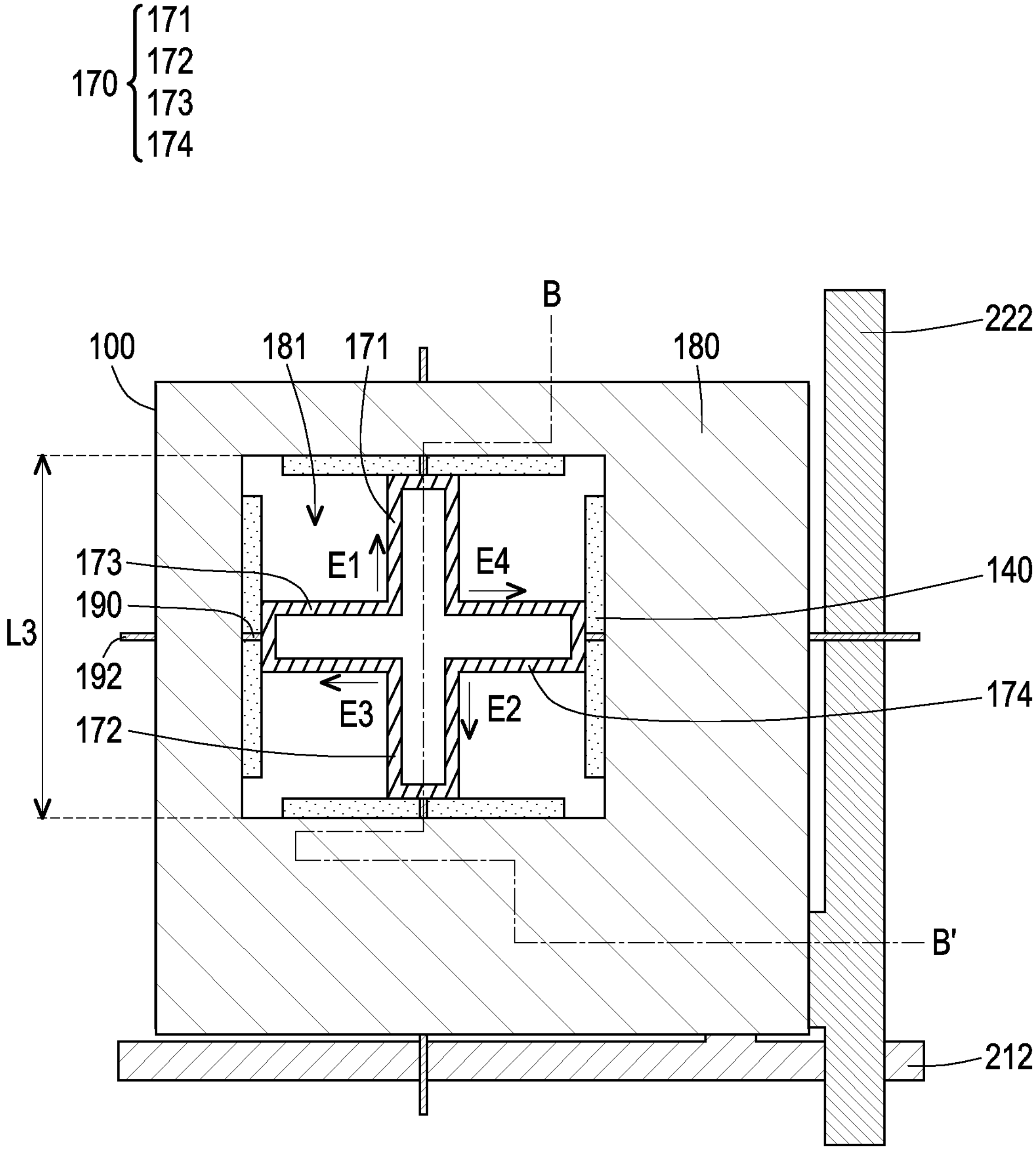
Figure 3A:
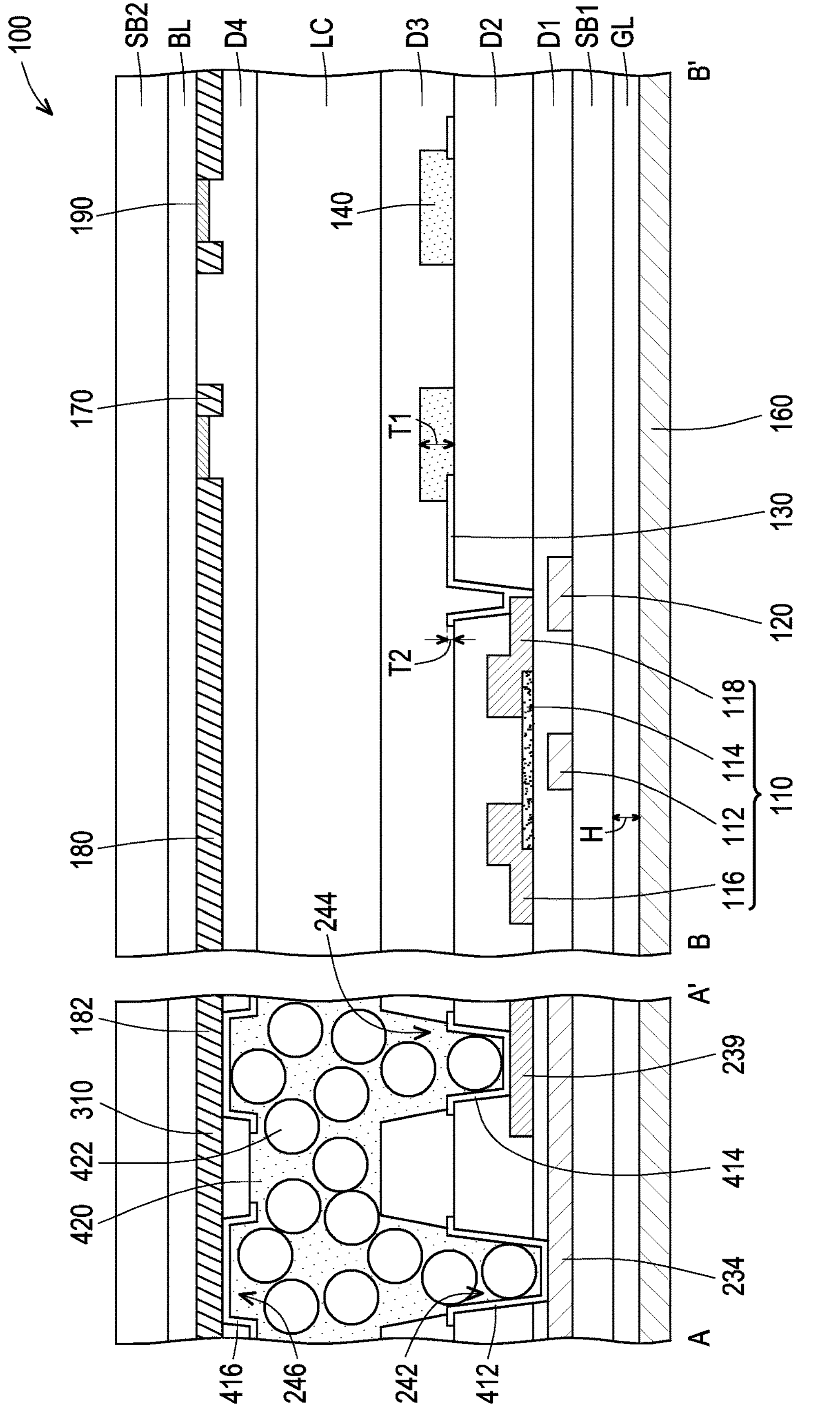
FIG. 3A is a schematic cross-sectional view of an antenna device according to an embodiment of the present invention.

FIG. 1 is a schematic top view of an antenna device 1 according to an embodiment of the present invention. For the sake of illustration, FIG. 1 omits the specific structure of antenna unit 100, which can be referenced in FIG. 2B. FIG. 2A and FIG. 2B are schematic top views of an antenna unit 100 in the antenna device 1 of FIG. 1. To facilitate the description of the structure of the antenna unit 100, FIG. 2A omits the second antenna electrode 170, the third antenna electrode 180, the second connection line 190, and the third connection line 192 in FIG. 2B. FIG. 3A is a cross-sectional view of the antenna device 1 according to an embodiment of the present invention, wherein FIG. 3A corresponds to the position of line A-A' in FIG. 1 and the position of line B-B' in FIG. 2A and FIG. 2B.

Referring first to FIG. 1, the antenna device 1 includes a plurality of scan lines 212, a plurality of data lines 222, a plurality of antenna units 100, first antistatic structures 214, second antistatic structures 224, a conductive ring 230, a scan line circuit 210 and a data line circuit 220.

The antenna units 100 are arranged in an array, and each antenna unit 100 is connected to a corresponding one scan line 212 and a corresponding one data line 222. The conductive ring 230 is surrounding the array of antenna units 100 and crossing the scan lines 212 and the data lines 222. The scan line circuit 210 is electrically connected to the scan lines 212, and the data line circuit 220 is electrically connected to the data lines 222. The scan line circuit 210 and the data line circuit 220 are, for example, circuits formed directly on the substrate, or they may be chips disposed on the substrate.

The first antistatic structures 214 and the second antistatic structures 224 are electrically connected to the scan lines 212 and the data lines 222 respectively. In some embodiments, the first antistatic structures 214 and the second antistatic structures 224 include, for example, lightning rods, diodes, or antistatic rings, which can prevent the antenna units 100 (such as the thin film transistor located therein) from being damaged by static electricity.

In some embodiments, the spacing between the centers of adjacent antenna units 100 is $0.15\lambda_0$~$1.0\lambda_0$ (for example, $0.15\lambda_0$~$0.5\lambda_0$), wherein $\lambda_0$ is the wavelength of the wireless signal to be received or transmitted in the air.

Referring to FIGS. 1, 2A, 2B and 3A, the antenna device 1 includes one or more antenna array substrates 10. The antenna array substrate 10 includes a first substrate SB1, a second substrate SB2, a liquid crystal layer LC and a plurality of antenna units 100.

The material of the first substrate SB1 includes glass, quartz, organic polymer or other suitable materials.

Thin film transistors 110, capacitor electrodes 120, first connection lines 130, first antenna electrodes 140, the scan lines 212, the conductive ring 230, the data lines 222, a first dielectric layer D1, a second dielectric layer D2, a third dielectric layer D3 are located above a side of the first substrate SB1 near the liquid crystal layer LC.

The gate electrodes 112 of the thin film transistors 110, the capacitor electrodes 120, the scan lines 212, the first conductive ring components 232, the second conductive ring components 234 and the third conductive ring components 236 are located on the first substrate SB1. In some embodiments, the gate electrodes 112, the capacitor electrodes 120, the scan lines 212, the first conductive ring components 232, the second conductive ring components 234 and the third conductive ring components 236 belong to the same conductive layer, for example, the first metal layer. In some embodiments, the material of the first metal layer includes chromium, gold, silver, copper, tin, lead, hafnium, tungsten, molybdenum, neodymium, titanium, tantalum, aluminum, zinc, nickel or an alloy of the above metals or stacked layers of the above metals. In some embodiments, the first metal layer includes stacked layers of titanium, aluminum and titanium.

The scan lines 212, the first conductive ring components 232 and the third conductive ring components 236 are extending along a first direction Y1. The scan lines 212 connect the gate electrodes 112 and the first antistatic structures 214. The capacitor electrodes 120 are separated from the scan lines 212. In some embodiments, the capacitor electrodes 120 of adjacent antenna units 100 are connected to each other through a common signal line (not shown). In some embodiments, the common signal line and the capacitor electrodes 120 are integrated as one and both belong to the first metal layer. In some embodiments, the shape of the capacitor electrode 120 includes a strip, a square, a circle, an oval, a triangle, or other geometric shapes.

The first dielectric layer D1 covers the first metal layer. The first metal layer is located between the first dielectric layer D1 and the first substrate SB1. In some embodiments, the material of the first dielectric layer D1 includes silicon oxide, silicon nitride, silicon oxynitride, aluminum oxide, hafnium oxide, zirconium oxide or other suitable materials.

The semiconductor layer is located above the first dielectric layer D1 and includes the channel structures 114 of the thin film transistors 110. Each channel structure 114 is overlapping with a corresponding gate electrode 112. In some embodiments, the material of the semiconductor layer includes amorphous silicon, polycrystalline silicon, microcrystalline silicon, single crystal silicon, organic semiconductor material, oxide semiconductor material (for example: indium zinc oxide, indium gallium zinc oxide or other suitable materials, or a combination of the above materials) or other suitable material or a combination of the above materials.

The first source/drain electrodes 116 of the thin film transistors 110, the second source/drain electrodes 118 of the thin film transistors 110, the data lines 222, the fourth conductive ring components 238 and the auxiliary conductive lines 239 are located above the first dielectric layer D1. In some embodiments, the first source/drain electrodes 116, the second source/drain electrodes 118, the data lines 222, the fourth conductive ring components 238 and the auxiliary conductive lines 239 belong to the same conductive layer, such as the second metal layer. In some embodiments, the material of the second metal layer includes chromium, gold, silver, copper, tin, lead, hafnium, tungsten, molybdenum, neodymium, titanium, tantalum, aluminum, zinc, nickel or an alloy of the above metal or stacked layers of the above metals. In some embodiments, the second metal layer includes stacked layers of titanium, aluminum and titanium.

The data lines 222 and the fourth conductive ring components 238 are extending along a second direction Y2. The data lines 222 connect the first source/drain electrodes 116 and second antistatic structures 224.

In this embodiment, a thin film transistor 110 includes a gate electrode 112, a channel structure 114, a first source/drain electrode 116 and a second source/drain electrode 118, wherein the first source/drain electrode 116 and the second source/drain electrode 118 are connected to the channel structure 114 respectively. A capacitor electrode 120, the first dielectric layer D1 and the second source/drain electrode 118 are at least partially overlapped in the normal direction of the top surface of the first substrate SB1 to form a capacitor. The aforementioned capacitor is electrically connected to the thin film transistor 110 and a first antenna electrode 140.

Figure 15A:
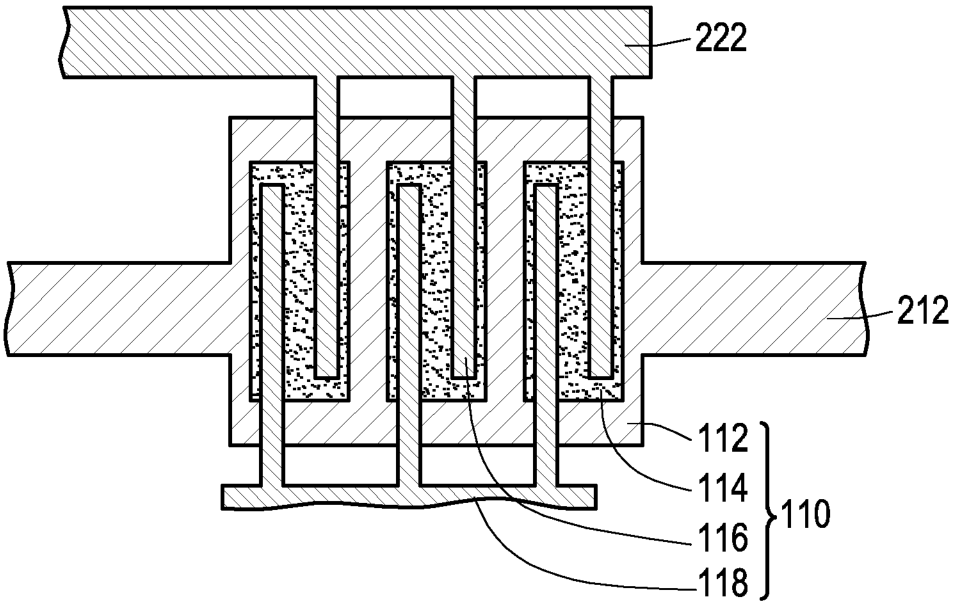
FIG. 15A is a schematic top view of a thin film transistor according to an embodiment of the present invention.
Figure 15B:
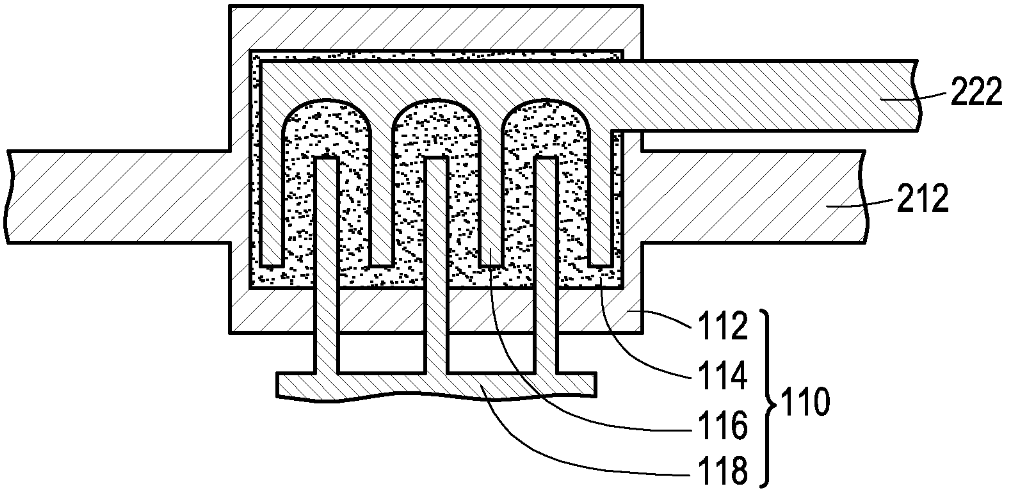
FIG. 15B is a schematic top view of another thin film transistor according to an embodiment of the present invention.

In some embodiments, the thin film transistor 110 is not limited to the structure shown in FIG. 2A and FIG. 3A. For example, in other embodiments, as shown in FIG. 15A, a thin film transistor 110 includes a gate electrode 112, a plurality of channel structures 114, a plurality of first source/drain electrodes 116 and a plurality of second source/drain electrodes 118, wherein the plurality of first source/drain electrodes 116 and the plurality of second source/drain electrodes 118 are symmetrically disposed. In other embodiments, as shown in FIG. 15B, a thin film transistor 110 includes a gate electrode 112, a channel structure 114, a first source/drain electrode 116 and a second source/drain electrode 118, wherein the first source/drain electrode 116 and the second source/drain electrode 118 are asymmetrical to each other.

The first conductive ring components 232, the second conductive ring components 234, the third conductive ring components 236 and the fourth conductive ring components 238 are electrically connected to each other to form the conductive ring 230 surrounding the antenna units 100. In this embodiment, the scan lines 212 cross the fourth conductive ring components 238 of the conductive ring 230, and the data lines 222 cross the first conductive ring components 232 of the conductive ring 230. The auxiliary conductive lines 239 are at least partially overlapping with the second conductive ring components 234 and the third conductive ring components 236, and the auxiliary conductive lines 239 are electrically connected to the second conductive ring components 234 and the third conductive ring components 236, thereby reducing the electrical resistance of the conductive ring 230. In some embodiments, the conductive ring 230 is electrically connected to a common voltage signal, such as a ground signal, a direct current signal, or an alternating current signal.

The second dielectric layer D2 is located above the semiconductor layer, the second metal layer and the first dielectric layer D1. In some embodiments, the material of the second dielectric layer D2 includes silicon oxide, silicon nitride, silicon oxynitride, aluminum oxide, hafnium oxide, zirconium oxide or other suitable materials.

The first pads 412, 414 and first connection lines 130 are located above the second dielectric layer D2. In some embodiments, the first pads 412, 414 and the first connection lines 130 belong to the same conductive layer, for example, the first connection conductive layer. In some embodiments, the material of the first connection conductive layer includes metal oxide conductive material (such as indium tin oxide, indium zinc oxide, or fluorine-doped indium oxide), metal nitride conductive material (such as titanium nitride or molybdenum nitride) or combinations of the above materials or other suitable materials. The electrical impedance of the first connection conductive layer is higher than the electrical impedance of the second metal layer.

In this embodiment, the first antenna electrodes 140 are located on the second dielectric layer D2 and is electrically connected to the thin film transistors 110 through the first connection lines 130. In this embodiment, the plurality of first antenna electrodes 140 are separated from each other and electrically connected to the second source/drain electrodes 118 through the first connection lines 130. The first antenna electrode 140 includes a single-layer structure or a multi-layer structure. In some embodiments, the material of the first antenna electrode 140 includes aluminum, copper, molybdenum, titanium or other suitable materials or combinations of the above materials.

In some embodiments, the first antenna electrode 140 needs to have a higher thickness to meet the skin depth required by the skin effect, so that the first antenna electrode 140 can transmit a sufficiently strong wireless signal and achieve a stronger coupled antenna strength. In some implementations, the thickness of the first antenna electrode 140 is between 0.6 micrometers and 3 micrometers.

In this embodiment, the first antenna electrode 140 has a first thickness T1, the first connection line 130 has a second thickness T2, and the ratio of the second thickness T2 to the first thickness T1 is ½ to 1/100, wherein ½ to 1/10 is preferred.

Connecting the first antenna electrode 140 and the thin film transistor 110 through a connection line 130 with a higher electrical impedance can reduce the leaky-wave generated by high-frequency signals on the connection line and prevent the antenna radiation intensity from being reduced. In some embodiments, the low-frequency operation signal of the thin film transistor 110 can be used to control the liquid crystal molecules in the liquid crystal layer LC, and the high-frequency signal is the antenna signal. For example, by changing the voltage (or electric field) applied to the liquid crystal layer LC through the low-frequency operation signal, the radiation intensity, radiation phase delay, radiation propagation direction, and radiation beam shape of the antenna unit 100 can be changed. The liquid crystal layer LC, for instance, is a low-loss liquid crystal layer that can work in the high-frequency range.

In this embodiment, the first antenna electrodes 140 each include a main portion 144 and a protruding portion 142. In this embodiment, the protruding portion 142 of the first antenna electrode 140 is connected to the inner side of the main portion 144. For example, one antenna unit 100 includes four first antenna electrodes 140, the protruding portions 142 of the left and right first antenna electrodes 140 face each other, and the protruding portions 142 of the upper and lower first antenna electrodes 140 face each other. In some embodiments, the protruding portion 142 of the first antenna electrode 140 has a first length L1 and the main portion 144 has a second length L2, wherein the second length L2 is greater than the first length L1.

The first connection line 130 is extending outward from each of the first antenna electrodes 140, and an angle between the extending direction of the first connection line 130 extending outward from the corresponding first antenna electrode 140 and the normal direction of the sidewall of the corresponding first antenna electrode 140 is θ, and θ is greater than or equal to 0 degrees and less than 60 degrees, wherein 30 degrees to 50 degrees is preferred. For example, in the case of 45 degrees, the impact on both polarization directions can be reduced. In the embodiment of FIG. 2A, θ is equal to 0 degrees as an example.

In this embodiment, a first connection line 130 includes a first connection portion 131, a second connection portion 132, a third connection portion 133 and a fourth connection portion 134, wherein the first connection portion 131, the second connection portion 132, the third connection portion 133 and the fourth connection portion 134 are respectively connected to the corresponding first antenna electrode 140. In some embodiments, the first connection line 130 further includes a connection ring 135 and a conductive line portion 136. The first connection portion 131, the second connection portion 132, the third connection portion 133 and the fourth connection portion 134 are connected to the inner side of the connection ring 135, and the conductive line portion 136 is connected to the outer side of the connection ring 135. The conductive line portion 136 electrically connects the connection ring 135 to the thin film transistor 110. In this embodiment, the conductive line portion 136 of the first connection line 130 is filled in the through hole of the second dielectric layer D2 and contacts the second source/drain electrode 118 located below the aforementioned through hole. The third dielectric layer D3 covers the aforementioned through hole.

In some embodiments, the first connection portion 131 is extending outward from the corresponding first antenna electrode 140 along an extending direction X1, and the angle between the extending direction X1 and the normal direction of the sidewall of the corresponding first antenna electrode 140 is greater than or equal to 0 degrees and less than 60 degrees to avoid leakage of high frequency signals. The second connection portion 132, the third connection portion 133 and the fourth connection portion 134 are also similarly designed and will not be described here.

In some embodiments, the first connection line 130 includes other shapes. For example, the first connection line 130 includes a straight line segment, a curved line segment or other types of line segments or a combination of multiple different types of line segments. In some embodiments, the leakage of high frequency signals can be further avoided by disposing curved line segments.

In some embodiments, the horizontal distance between the center of the first antenna electrode 140 and the contact point of the first connection line 130 contacting the first antenna electrode 140 is d, wherein the horizontal distance d is greater than or equal to 0 and less than 0.1 $\lambda_0$, wherein less than $0.05\lambda_0$ is preferred. In some embodiments, the width of the connection line 130 at the connection point with the first antenna electrode 140 is less than 10 micrometers, such as 3.5 micrometers to 10 micrometers.

There are a plurality of first through holes 242 in the first dielectric layer D1 and the second dielectric layer D2. The first through holes 242 are extending through the first dielectric layer D1 and the second dielectric layer D2, and the first metal layer is included below the first through holes 242. There are a plurality of second through holes 244 in the second dielectric layer D2. The second through holes 244 are extending through the second dielectric layer D2, and the second metal layer is included below the second through holes 244.

The first pads 412, 414 are electrically connected to the conductive ring 230, wherein the first pad 412 fills in the corresponding first through hole 242 to contact the first metal layer, and the second pad 422 fills in the corresponding second through hole 244 to contact the second metal layer. For example, a plurality of first pads 412 are in contact with the first conductive ring components 232, the second conductive ring components 234 and the third conductive ring components 236 respectively, and a plurality of first pads 414 are in contact with the fourth conductive ring components 238 and the auxiliary conductive lines 239 respectively.

In some embodiments, each antenna unit 100 further includes a reflection electrode 160. The reflection electrode 160 is located on the second side of the first substrate SB1 away from the second substrate SB2. In some embodiments, the material of reflection electrode 160 includes metal or other suitable material. In some embodiments, a gap layer GL is included between the reflection electrode 160 and the first substrate SB1. The gap layer GL includes a dielectric material with a dielectric coefficient of 1 to 100000 (for example, 1 to 1000). In some embodiments, the gap layer GL is formed of, for example, a glue material, an adhesive tape, or other suitable materials, wherein the glue material includes a layer formed of a fluid adhesive such as glue. In some embodiments, the gap layer GL may be solid state, liquid state, or gas state. In some embodiments, when the gap layer GL includes an air gap of the gas state, the gap layer GL may include support structures such as cylinders, spheres, ellipsoids, or the like for supporting the reflection electrode 160. In some embodiments, the vertical distance H between the reflection electrode 160 and the first substrate SB1 is $0\lambda_0$ to $0.5\lambda_0$, which can have the function of modulating the resonance frequency shift, radiation intensity difference and radiation phase delay. In some embodiments, the vertical distance H is the thickness of the gap layer GL.

In some embodiments, by adjusting the thickness and/or material of the gap layer GL, the phase modulation amount and the reflection intensity of the antenna signal can be modulated.

The second substrate SB2 is overlapping with the first substrate SB1. In some embodiments, the material of second substrate SB2 includes glass, quartz, organic polymer or other suitable materials.

In some embodiments, the buffer layer BL is formed on the second substrate SB2, but the present invention is not limited thereto. The buffer layer BL can reduce the deformation of the second substrate SB2 caused by the subsequent formation of thick metal coatings (such as the second antenna electrode 170 and the third antenna electrode 180). In other embodies, the buffer layer BL can be omitted. In some embodiments, the buffer layer BL is located between the second antenna electrode 170 and the second substrate SB2 and between the third antenna electrode 180 and the second substrate SB2. In some embodiments, the thickness of the buffer layer BL is ⅓ to ⅕ of the thickness of the second antenna electrode 170 (or the third antenna electrode 180).

The second antenna electrode 170, the third antenna electrode 180, the second connection line 190 and the fourth dielectric layer D4 are located above the first side of the second substrate SB2 near the liquid crystal layer LC.

The second antenna electrode 170 and the third antenna electrode 180 are located on the buffer layer BL. In some embodiments, the second antenna electrode 170 and the third antenna electrode 180 belong to the same conductive layer, such as a common electrode layer. In some embodiments, the material of the common electrode layer includes chromium, gold, silver, copper, tin, lead, hafnium, tungsten, molybdenum, neodymium, titanium, tantalum, aluminum, zinc, nickel or an alloy of the above metals or stacked layers of the above metals.

The second antenna electrode 170 is annulus-shaped. For example, the second antenna electrode 170 includes a cross-shaped annulus, and includes a first portion 171, a second portion 172, a third portion 173 and a fourth portion 174. The first portion 171 is extending from the central connection region of the second antenna electrode 170 along the first extending direction E1. The second portion 172 is extending from the central connection region of the second antenna electrode 170 along the second extending direction E2 opposite to the first extending direction E1. The third portion 173 is extending from the central connection region of the second antenna electrode 170 along the third extending direction E3, wherein the third extending direction E3 is perpendicular to the first extending direction E1 and the second extending direction E2. The fourth portion 174 is extending from the central connection region of the second antenna electrode 170 along the fourth extending direction E4 opposite to the third extending direction E3. The first portion 171, the third portion 173, the second portion 172 and the fourth portion 174 are connected in sequence to form a cross-shaped annulus. In some embodiments, the second antenna electrode 170 has a 90 degrees rotational symmetry. In some embodiments, the first portion 171, the second portion 172, the third portion 173, and the fourth portion 174 have the same shape as each other but have different directions.

The second antenna electrode 170 is overlapping with the first antenna electrode 140 in the normal direction of the top surface of the second substrate SB2. In some embodiments, the protruding portion 142 of each first antenna electrode 140 is overlapping with the second antenna electrode 170.

The protruding portions 142 of the four first antenna electrodes 140 are respectively overlapping with the outermost turning portion of the first portion 171, the outermost turning portion of the second portion 172, the outermost turning portion of the third portion 173, and the outermost turning portion of the fourth portion 174.

The third antenna electrode 180 has a first opening 181, and the second antenna electrode 170 is located within the first opening 181. The third antenna electrode 180 is surrounding the second antenna electrode 170. In some embodiments, four first antenna electrodes 140 are respectively disposed corresponding to four sides of the first opening 181. In some embodiments, the four sides of the first opening 181 have a third length L3, and the main portion 144 of the first antenna electrode 140 has a second length L2, the ratio of the second length L2 to the third length L3 (L2/L3) is ⅛ to ¾. In some embodiments, the third length L3 is 300 micrometers to 1100 micrometers. In some embodiments, the third length L3 is, for example, $0.1\lambda_0$. In some embodiments, the third antenna electrode 180 covers the channel structure 114 of the thin film transistor 110 to prevent external ambient light from directly irradiating the channel structure 114 and causing the issue of current leakage.

The second antenna electrode 170 and the third antenna electrode 180 are connected to each other through the second connection line 190. In some embodiments, the thickness of second connection line 190 is equal to or different from (e.g., less than) the thickness of the second antenna electrode 170 and the third antenna electrode 180. In some embodiments, the material of the second connection line 190 is the same as or different from the materials of the second antenna electrode 170 and the third antenna electrode 180.

In some embodiments, each antenna unit 100 includes a thin film transistor 110, a capacitor electrode 120, a first connection line 130, a plurality of first antenna electrodes 140, a second antenna electrode 170, a third antenna electrode 180 and a second connection line 190. In some embodiments, the third antenna electrodes 180 of adjacent antenna units 100 are electrically connected to each other through the third connection line 192. In this embodiment, a ring-shaped opening is included around each third antenna electrode 180, and a third connection line 192 is disposed in the ring-shaped opening. The ring-shaped opening may reduce the coupling loss of the antenna signal and increase the bandwidth.

For example, the third connection line 192 and the second connection line 190 belong to the same conductive layer, such as the second connection conductive layer. In some embodiments, the material of the second connection conductive layer includes, for example, metal. For example, the second connection conductive layer is formed using a titanium process, thereby saving production costs. In other embodiments, the second antenna electrode 170, the third antenna electrode 180, the second connection line 190 and the third connection line 192 belong to the same conductive layer.

The fourth dielectric layer D4 is located on the second antenna electrode 170 and the third antenna electrode 180 and has a plurality of third through holes 246. The third through holes 246 are overlapping with the common electrode 182. For example, the common electrode 182 and the third antenna electrode 180 belong to the same conductive layer, and the common electrode 182 is electrically connected to the third antenna electrode 180.

A plurality of second pads 416 are located on the fourth dielectric layer D4 and are respectively electrically connected to the common electrode 182 through the plurality of third through holes 246. In some embodiments, the material of the second pads 416 include a metal oxide material (such as indium tin oxide, indium zinc oxide, fluorine-doped indium oxide), a metal nitride conductive material (such as titanium nitride or molybdenum nitride), or the combinations of the above materials or other suitable material.

The liquid crystal layer LC is located between the first substrate SB1 and the second substrate SB2. In some embodiments, the thickness of the liquid crystal layer LC is less than 10 micrometers, for example, 1 micrometer to 10 micrometers. The conductive connection structure 422 electrically connects the first pads 412, 414 and the second pads 416, so as to electrically connect the conductive ring 230 to the third antenna electrode 180. In some embodiments, the conductive connection structure 422 includes conductive particles dispersed in a sealant 420, which encapsulates the conductive connection structure 422. In some embodiments, the material of the conductive connection structure 422 includes gold, silver, aluminum, copper or alloys of the above metals or other conductive materials. The sealant 420 surrounds the liquid crystal layer LC. In some embodiments, the conductive connection structure 422 and the sealant 420 are silver paste.

Based on the above, in this embodiment, the antenna unit 100 has the effect of dual-linear polarization, and has the advantages of high phase modulation amount and high reflection intensity for the radiation signal.

Figure 3B:
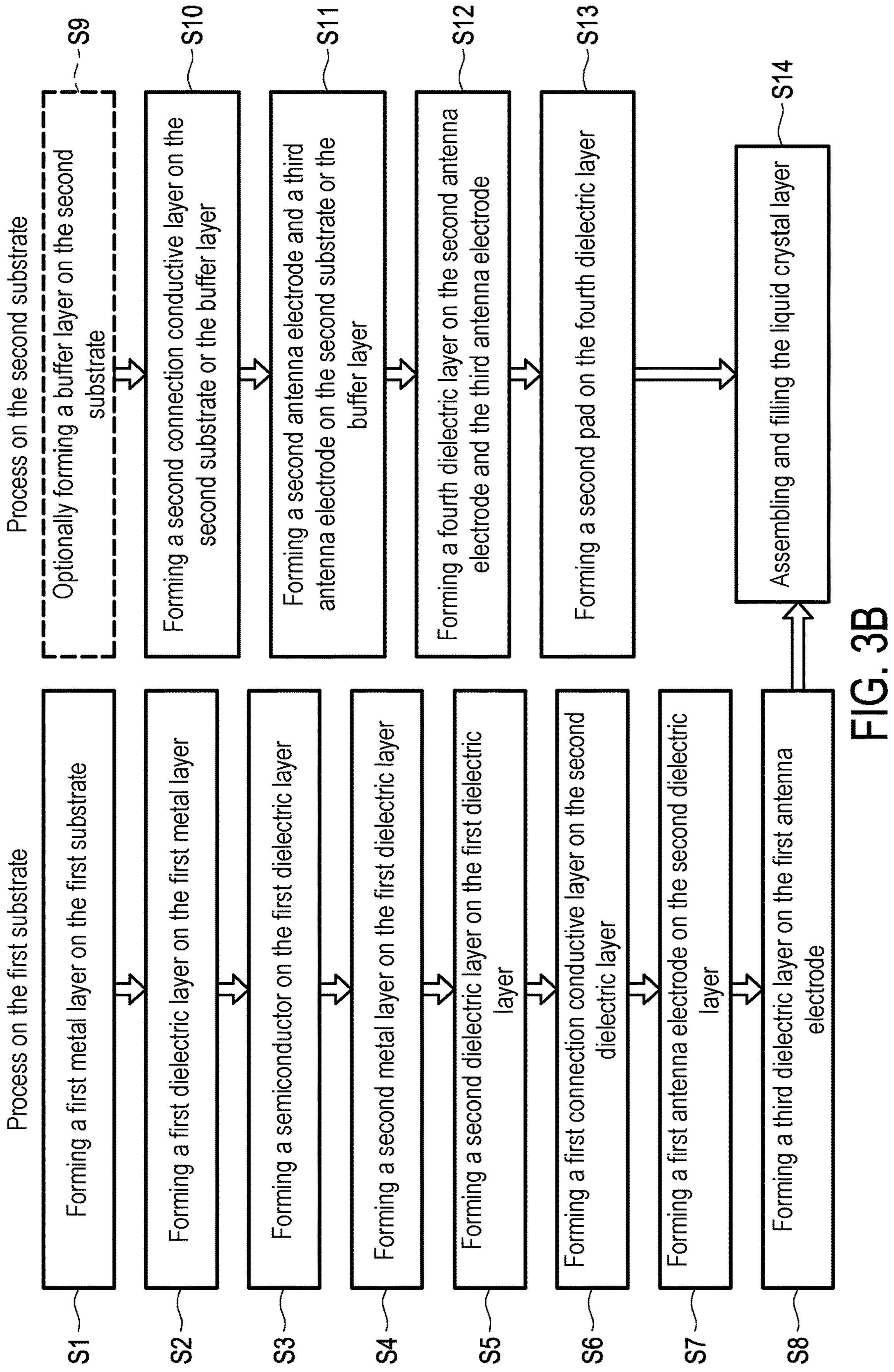
FIG. 3B is a flow chart of a manufacturing method of the antenna device of FIG. 3A.

FIG. 3B is a flow chart of the manufacturing method of the antenna device 1 in FIG. 3A. Referring to FIGS. 1 to 3A, in step S1 of FIG. 3B, a first metal layer is formed on the first substrate SB1. In some embodiments, the first metal layer includes the gate electrode 112, the capacitor electrode 120, the scan line 212, the first conductive ring component 232, the second conductive ring component 234 and the third conductive ring component 236.

In step S2 of FIG. 3B, a first dielectric layer D1 is formed on the first metal layer.

In step S3 of FIG. 3B, a semiconductor layer is formed on the first dielectric layer D1. In some embodiments, the semiconductor layer includes the channel structures 114.

In step S4 of FIG. 3B, a second metal layer is formed on the first dielectric layer D1. In some embodiments, the second metal layer includes the first source/drain electrode 116, the second source/drain electrode 118, the data line 222, the fourth conductive ring component 238 and the auxiliary conductive line 239.

In step S5 of FIG. 3B, a second dielectric layer D2 is formed on the first dielectric layer D1.

In step S6 of FIG. 3B, the first connection conductive layer is formed on the second dielectric layer D2. In some embodiments, the first connection conductive layer includes the first pads 412, 414 and the first connection lines 130.

In step S7 of FIG. 3B, a first antenna electrode 140 is formed on the second dielectric layer D2. In some embodiments, the order of step S6 and step S7 can be reversed.

In step S8 of FIG. 3B, a third dielectric layer D3 is formed on the first antenna electrode 140.

In step S9 of FIG. 3B, a buffer layer BL is optionally formed on the second substrate SB2.

In step S10 of FIG. 3B, a second connection conductive layer is formed on the second substrate SB2 or the buffer layer BL. In some embodiments, the second connection conductive layer includes the second connection line 190 and the third connection line 192.

In step S11 of FIG. 3B, a second antenna electrode 170 and a third antenna electrode 180 are formed on the second substrate SB2 or the buffer layer BL. In some embodiments, the order of step S10 and step S11 may be reversed.

In step S12 of FIG. 3B, a fourth dielectric layer D4 is formed on the second antenna electrode 170 and the third antenna electrode 180.

In step S13 of FIG. 3B, a second pad 416 is formed on the fourth dielectric layer D4.

It should be noted that step S1 to step S8 can be performed before, after or at the same time as step S9 to step S13. In other words, the present invention does not limit whether the process on the first substrate SB1 or the process on the second substrate SB2 is performed first.

Next, in step S14 of FIG. 3B, the lower structure including the first substrate SB1 and the upper structure including the second substrate SB2 are assembled together, and a liquid crystal layer LC is filled between them. In some embodiments, a sealant 420 and a conductive connection structure 422 are disposed around liquid crystal layer LC. The sealant 420 and the conductive connection structure 422 may be firstly formed on the first substrate SB1 or on the second substrate SB2.

Figure 4A:
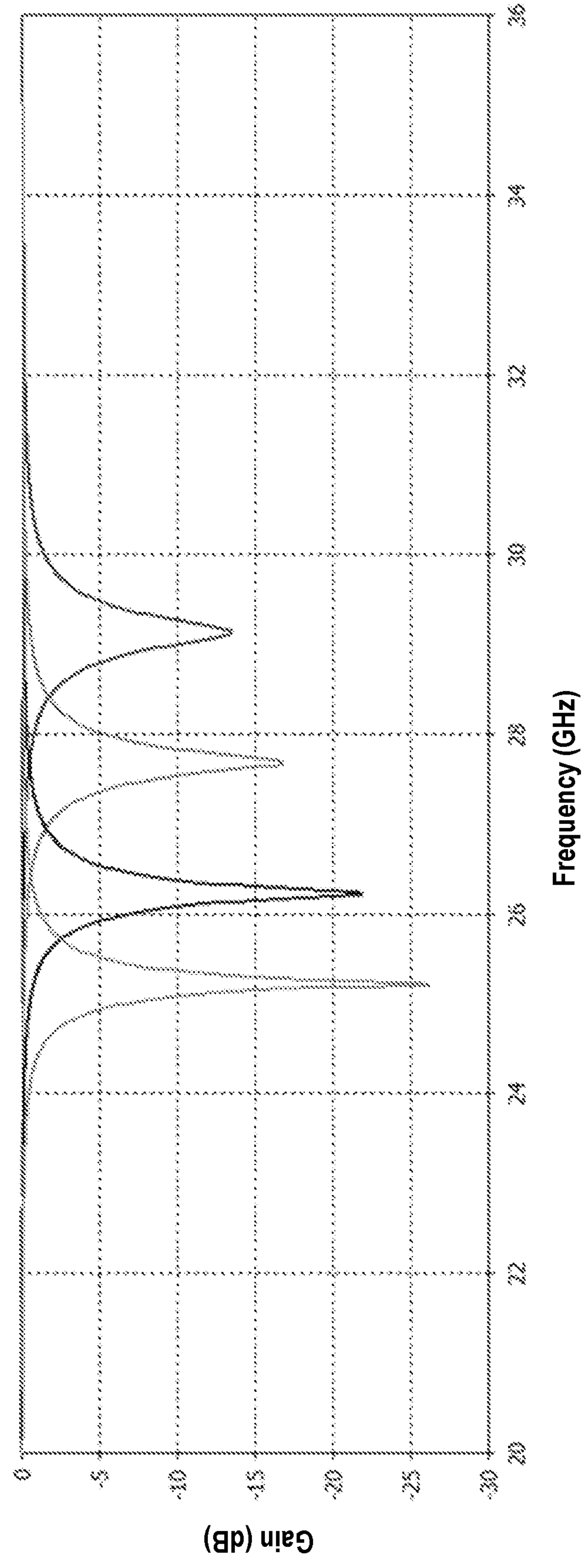
FIG. 4A and FIG. 4B are S11-parameter curves of an antenna device according to an embodiment of the present invention.
Figure 4B:
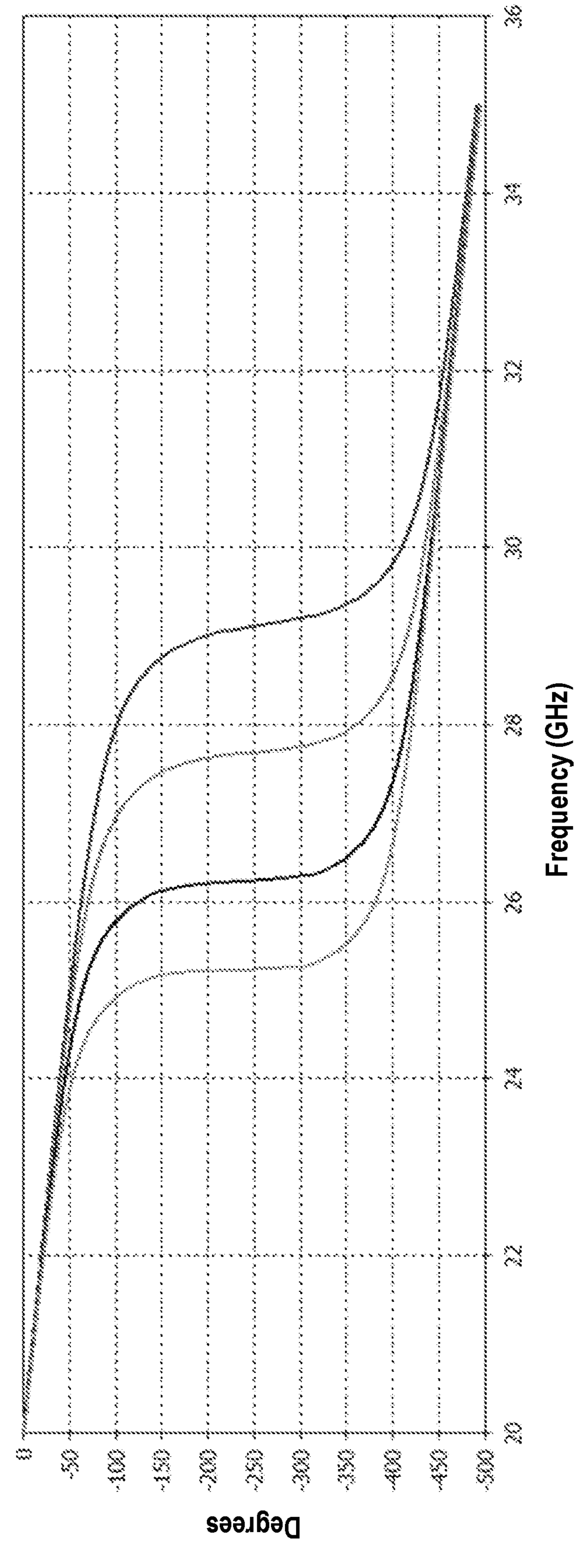

FIGS. 4A and 4B are S11-parameter curves of an antenna device according to an embodiment of the present invention. For the structure of the antenna device corresponding to FIGS. 4A and 4B, the antenna device 1 in FIG. 3A. In FIGS. 4A and 4B can be referred. By adjusting the liquid crystal molecular in the liquid crystal layer LC, different S11 parameter curves can be obtained. As shown in FIGS. 4A and 4B, the modulation of the reflection frequency that can be obtained by antenna device 1 may reach about 3.15 GHz, and the modulation of the phase may reach about 290 degrees. In addition, in this embodiment, the maximum radiated power of the antenna device is approximately −0.85 dB.

Figure 5A:
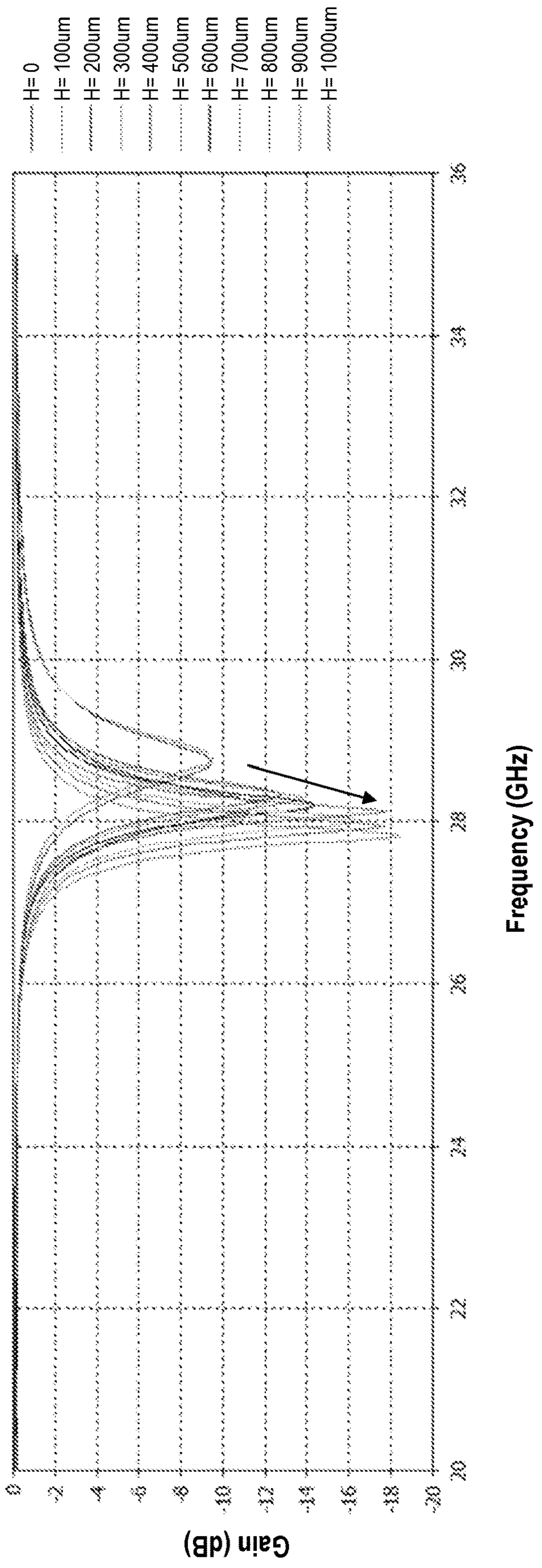
FIG. 5A and FIG. 5B are S11-parameter curves of some antenna devices according to an embodiment of the present invention.
Figure 5B:
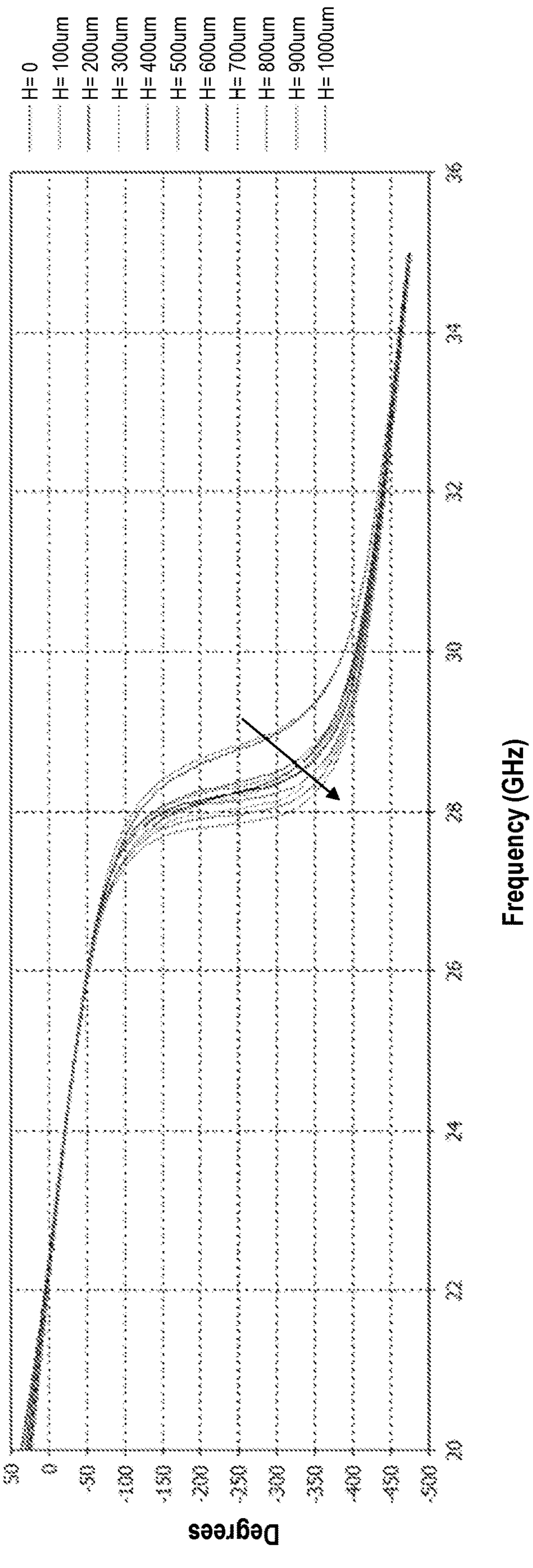

FIGS. 5A and 5B are S11-parameter curves of some antenna devices according to an embodiment of the present invention. For the structure of the antenna device corresponding to FIGS. 5A and 5B, the antenna device 1 in FIG. 3A can be referred. The vertical distance H between the reflection electrode 160 and the first substrate SB1 is adjusted through the thickness of the gap layer GL. It can be seen from FIGS. 5A and 5B that by changing the vertical distance H, the resonance frequency of the antenna signal can be modulated, and the phase shifting amount can be changed. Generally speaking, increasing the vertical distance H will cause the S11-parameter curves in FIGS. 5A and 5B to change in the direction of the arrow in the figure. More specifically, increasing the vertical distance H will generally make the phase change amplitude more severe and shift the S11-parameter curve toward low frequency.

Figure 6:
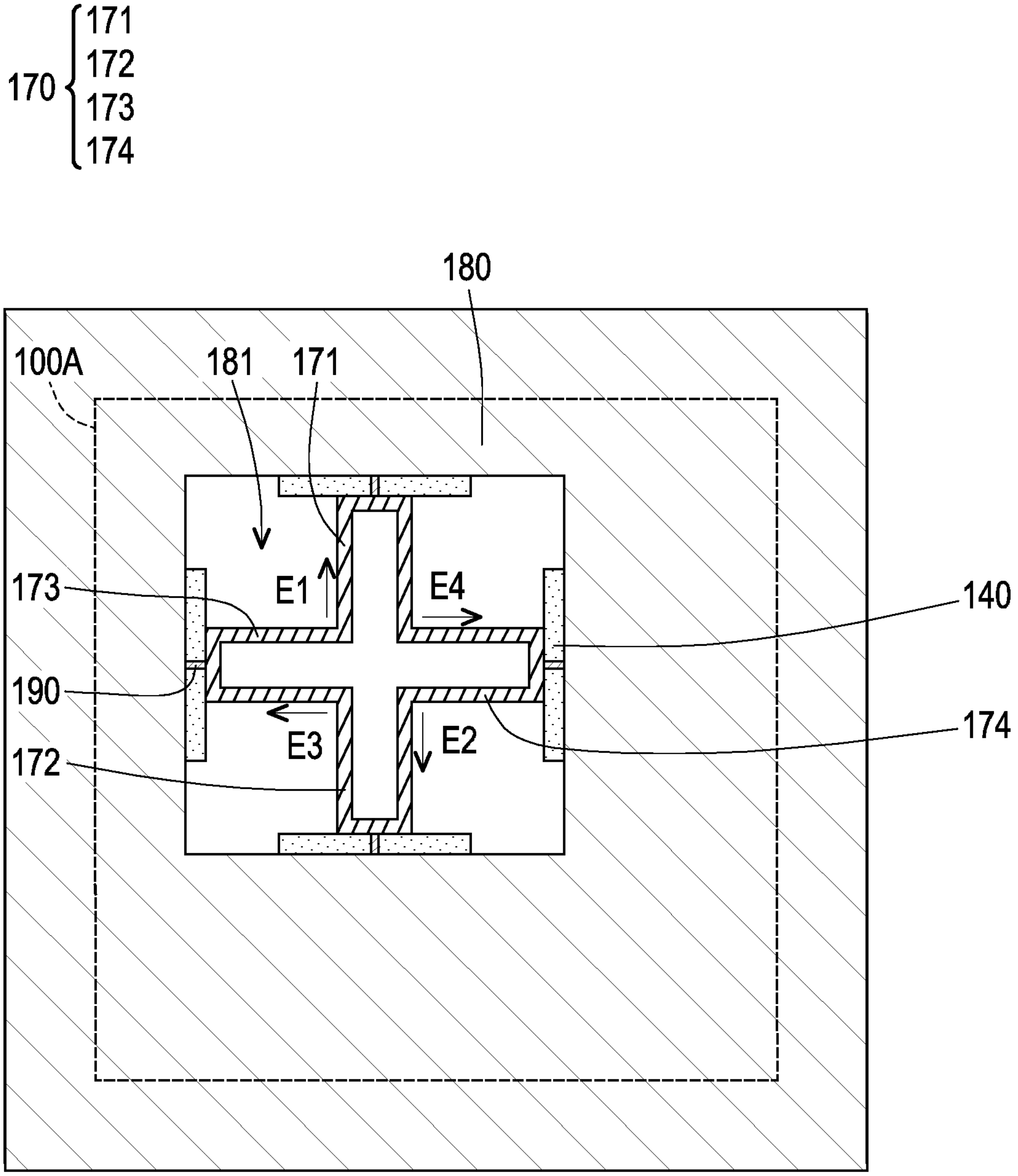
FIG. 6 is a schematic top view of an antenna unit according to an embodiment of the present invention.

FIG. 6 is a schematic top view of an antenna unit 100A according to an embodiment of the present invention. It should be noted herein that, in embodiments provided in FIG. 6, element numerals and partial content of the embodiments provided in FIGS. 1 to 3B are followed, the same or similar reference numerals being used to represent the same or similar elements, and description of the same technical content being omitted. For a description of an omitted part, reference may be made to the foregoing embodiment, and the descriptions thereof are omitted herein.

The main difference between the antenna unit 100A of FIG. 6 and the antenna unit 100 of FIG. 2B is that the third antenna electrode 180 of the antenna unit 100A of FIG. 6 is directly connected to the third antenna electrode 180 of another adjacent antenna unit 100A. The third antenna electrode 180 of the antenna unit 100 of FIG. 2B is connected to the third antenna electrode 180 of another adjacent antenna unit 100A through the third connection line 192. In the embodiment of FIG. 6, there is no opening between the third antenna electrodes 180 of adjacent antenna units 100A. In some embodiments, the length of the first antenna electrode 140 can be adjusted according to requirements. For example, the length of the first antenna electrode 140 of FIG. 6 is shorter than that of the first antenna electrode 140 of FIG. 2B.

Figure 7A:
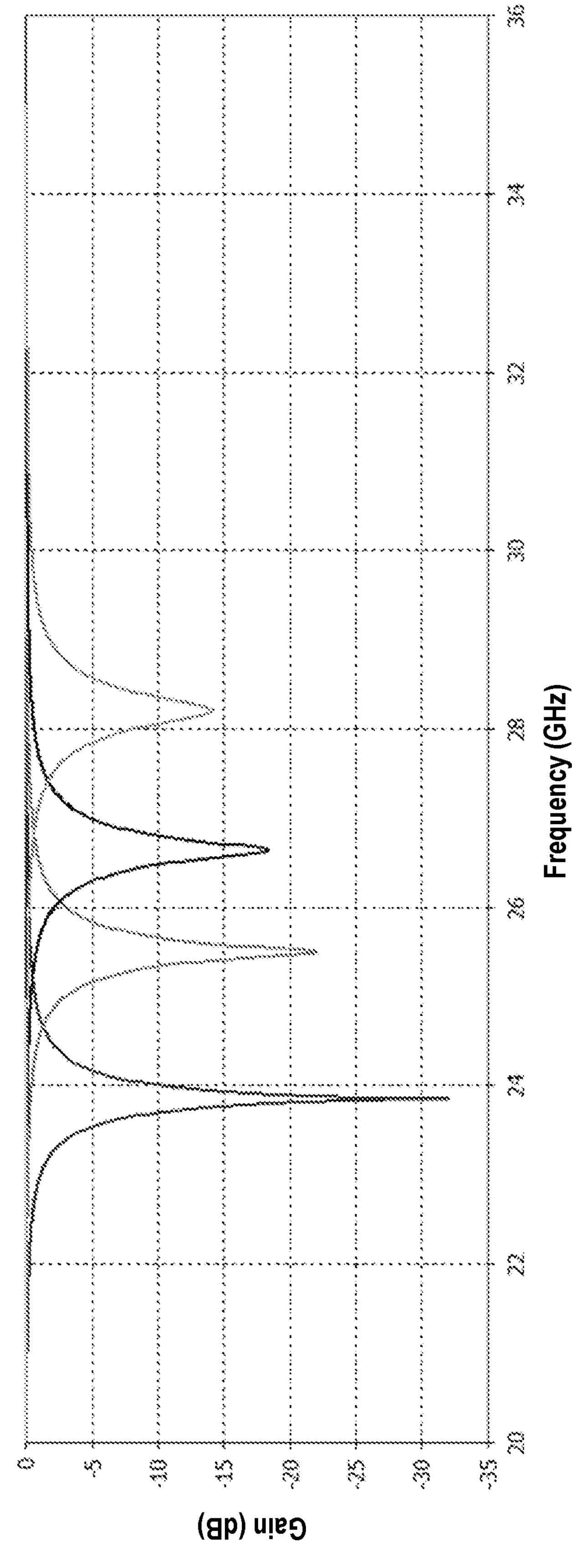
FIG. 7A and FIG. 7B are S11-parameter curves of some antenna devices according to an embodiment of the present invention.
Figure 7B:
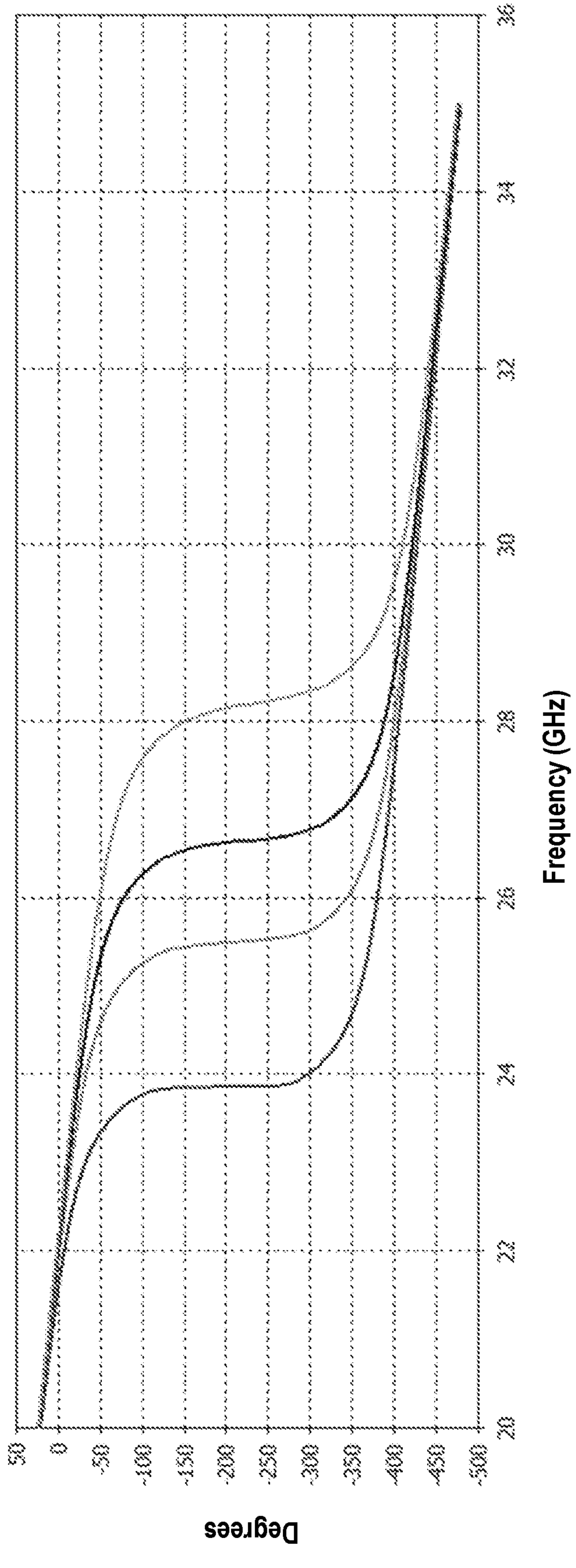

FIGS. 7A and 7B are S11-parameter curves of an antenna device according to an embodiment of the present invention. For the antenna unit of the antenna device corresponding to FIGS. 7A and 7B, the antenna unit 100A of FIG. 6 can be referred. In FIGS. 7A and 7B, by adjusting the liquid crystal molecular in the liquid crystal layer LC, different S11-parameter curves can be obtained. As shown in FIGS. 7A and 7B, the modulation of the reflection frequency that can be obtained by the antenna device may reach about 4.05 GHz, and the modulation of the phase can reach about 330 degrees. In addition, in this embodiment, the maximum radiated power of the antenna device is about −0.23 dB.

Figure 8A:
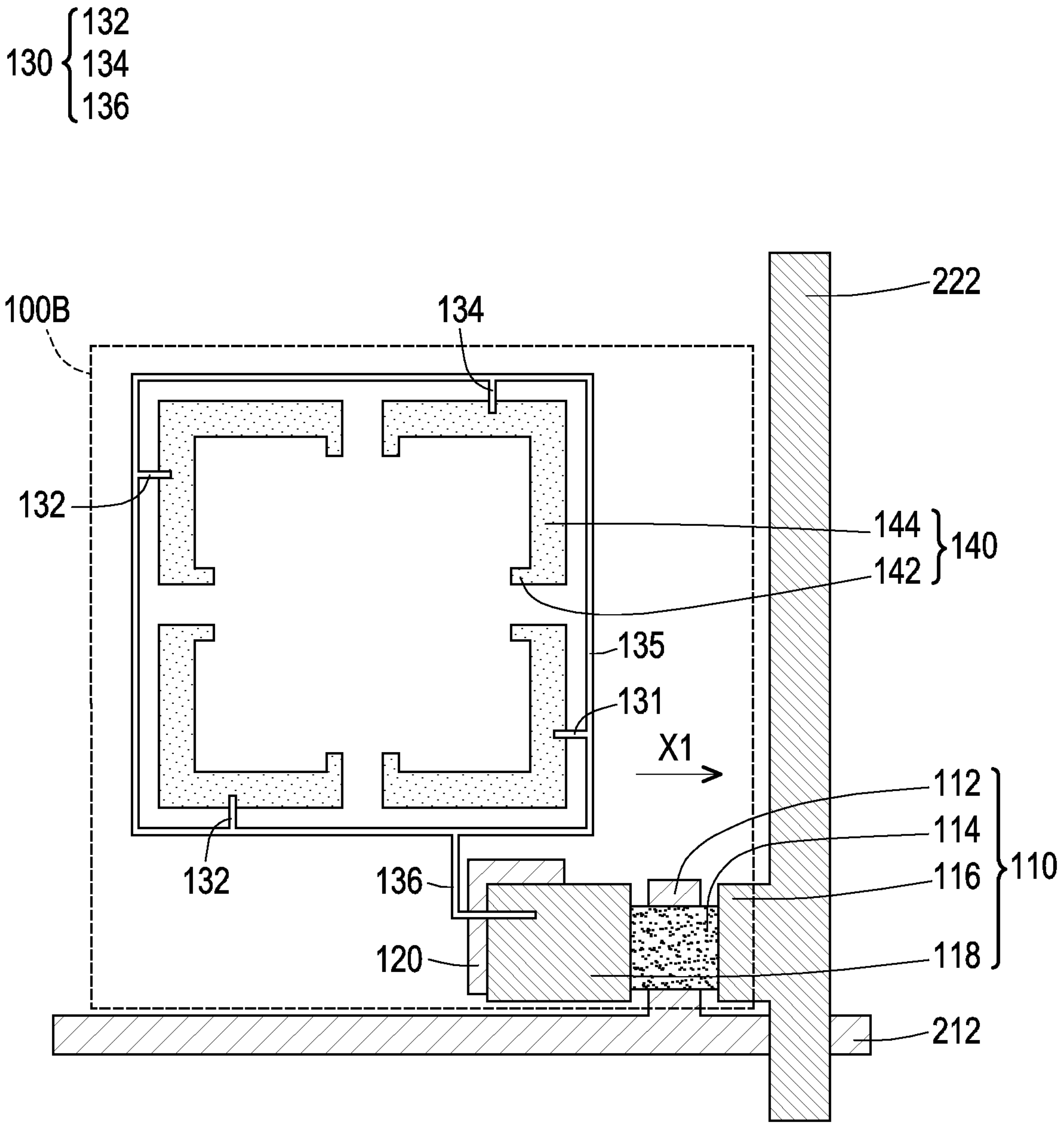
FIG. 8A and FIG. 8B are schematic top views of the antenna unit according to an embodiment of the present invention.
Figure 8B:
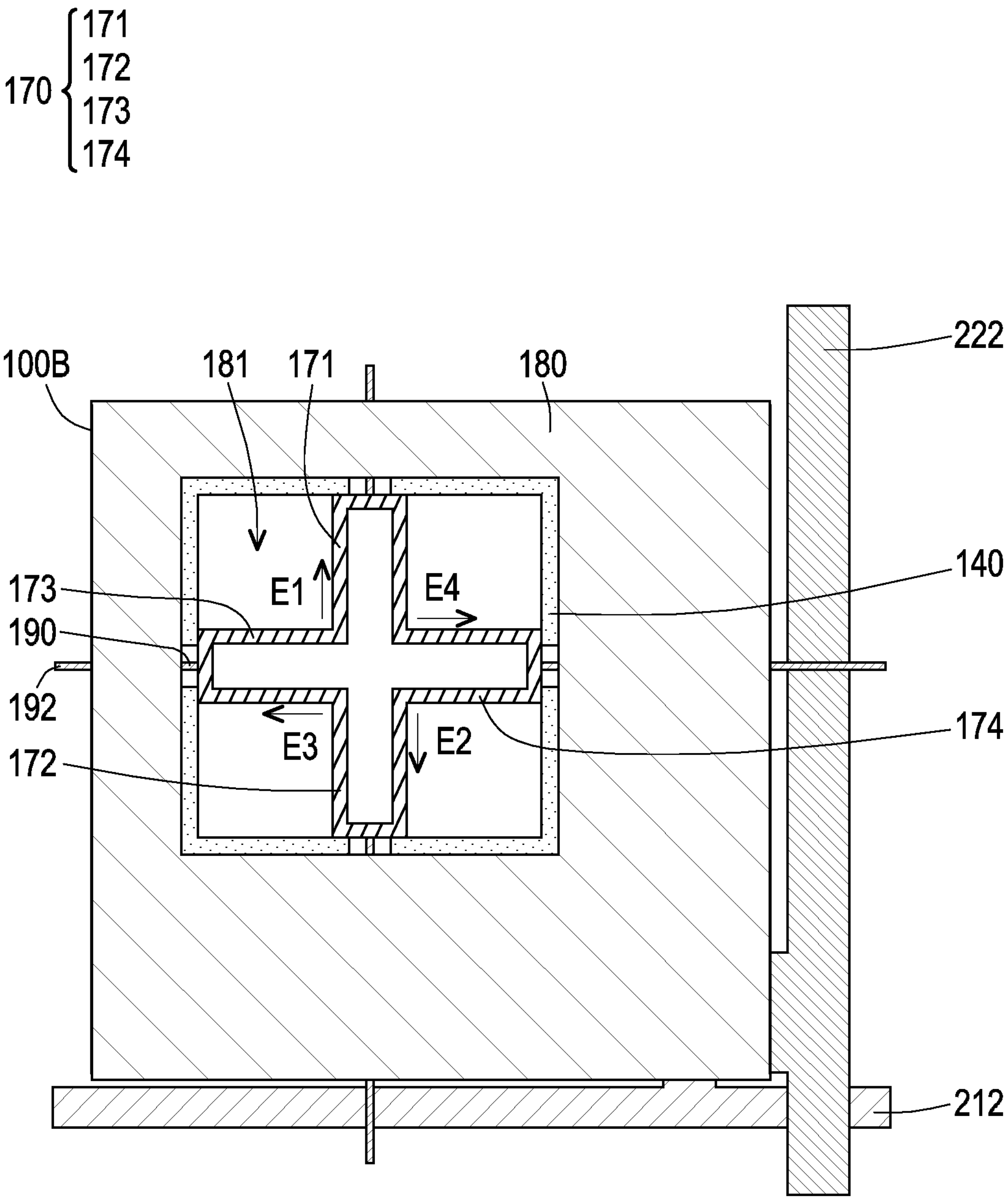

FIGS. 8A and 8B are schematic top views of the antenna unit 100B according to an embodiment of the present invention. In order to facilitate the descriptions of the structure of the antenna unit 100B, FIG. 8A omits the second antenna electrode 170, the third antenna electrode 180, the second connection line 190 and the third connection line 192 in FIG. 8B. It should be noted herein that, in embodiments provided in FIGS. 8A and 8B, element numerals and partial content of the embodiments provided in FIGS. 1 to 3B are followed, the same or similar reference numerals being used to represent the same or similar elements, and description of the same technical content being omitted. For a description of an omitted part, reference may be made to the foregoing embodiment, and the descriptions thereof are omitted herein.

The main difference between the antenna unit 100B of FIGS. 8A and 8B and the antenna unit 100 of FIG. 2B is that in the antenna unit 100B of FIGS. 8A and 8B, the four first antenna electrodes 140 are respectively disposed corresponding to the four corners of the first opening 181. The four first antenna electrodes 140 of the antenna unit 100 in FIG. 2B are respectively disposed corresponding to the four sides of the first opening 181.

In this embodiment, each of the four first antenna electrodes 140 respectively is overlapping with a corresponding one of the first portion 171 and the second portion 172 of the second antenna electrode 170 and a corresponding one of the third portion 173 and the fourth portion 174 of the second antenna electrode 170 in the normal direction of the top surface of the second substrate. In some embodiments, the first antenna electrode 140 is L-shaped. Each first antenna electrode 140 includes a main portion 144 and two protruding portions 142. The two protruding portions 142 are respectively overlapping with a corresponding one of the first portion 171 and the second portion 172 of the second antenna electrode 170 and a corresponding one of the third portion 173 and the fourth portion 174 of the second antenna electrode 170.

Figure 9A:
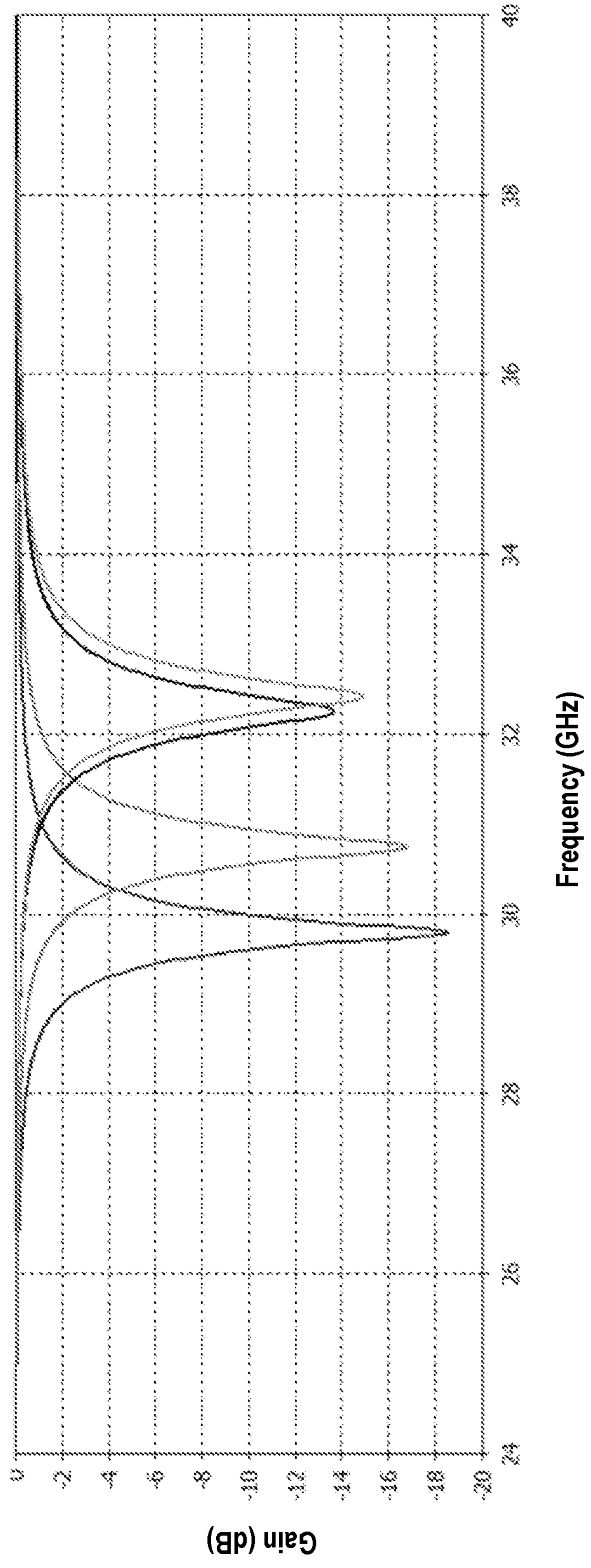
FIG. 9A and FIG. 9B are S11-parameter curves of some antenna devices according to an embodiment of the present invention.
Figure 9B:
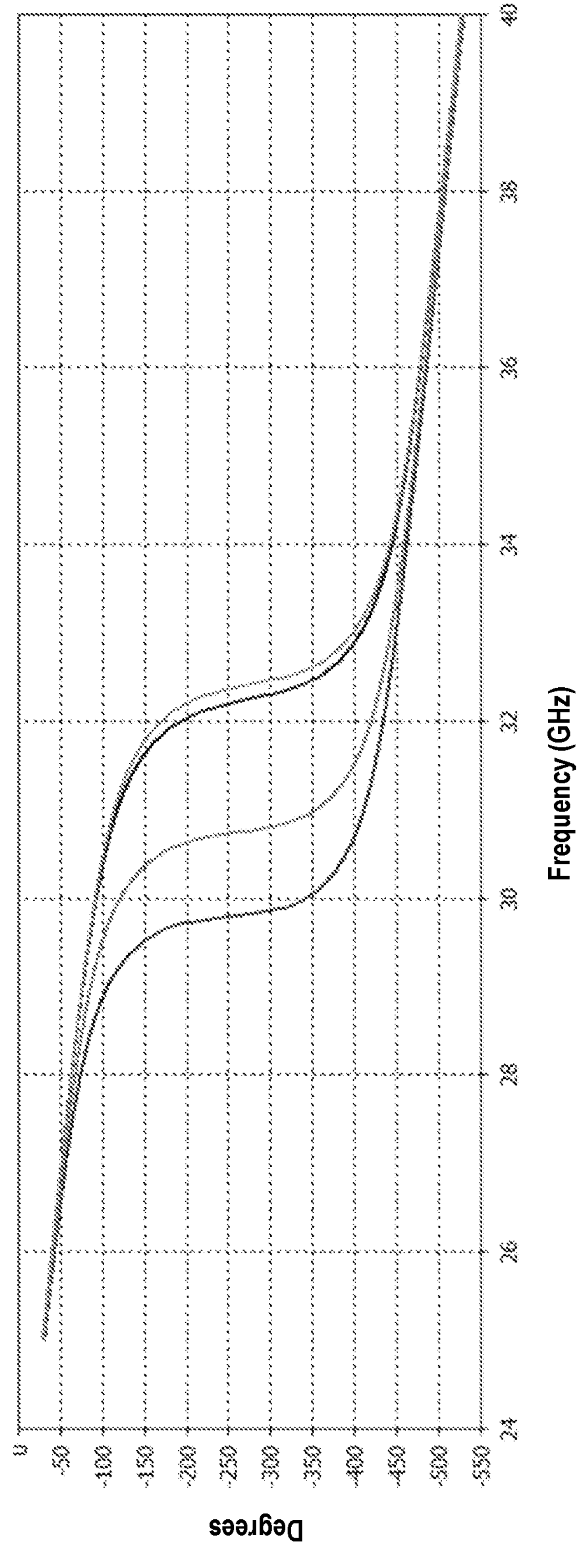

FIGS. 9A and 9B are S11-parameter curves of an antenna device according to an embodiment of the present invention. For the antenna unit of the antenna device corresponding to FIGS. 9A and 9B, the antenna unit 100B of FIGS. 8A and 8B can be referred. In FIGS. 9A and 9B, by adjusting the liquid crystal molecular in the liquid crystal layer LC, different S11-parameter curves can be obtained. As shown in FIGS. 9A and 9B, the modulation of the reflection frequency that can be obtained by the antenna device may reach about 2.63 GHz, and the modulation of the phase can reach about 297.4 degrees. In addition, in this embodiment, the maximum radiated power of the antenna device is about −1.03 dB.

Figure 10:
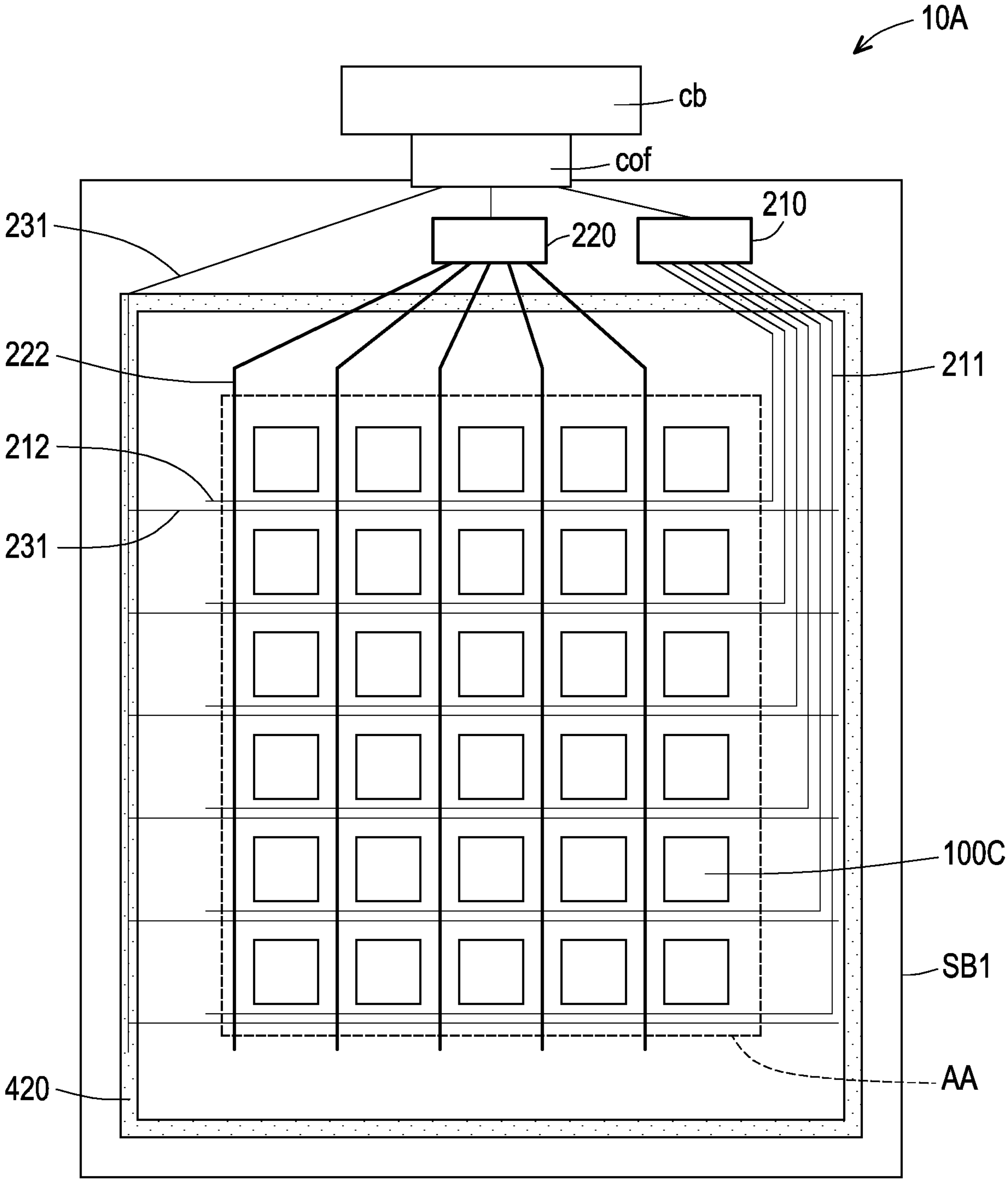
FIG. 10 is a schematic top view of an antenna array substrate according to an embodiment of the present invention.

FIG. 10 is a schematic top view of an antenna array substrate according to an embodiment of the present invention. It should be noted herein that, in embodiments provided in FIG. 10, element numerals and partial content of the embodiments provided in FIGS. 1 to 3B are followed, the same or similar reference numerals being used to represent the same or similar elements, and description of the same technical content being omitted. For a description of an omitted part, reference may be made to the foregoing embodiment, and the descriptions thereof are omitted herein.

Referring to FIG. 10, the antenna array substrate 10A includes antenna units 100C, a scan line circuit 210, a data line circuit 220, scan lines 212, data lines 222, common signal lines 231, a chip-on-film package cof, a circuit board cb and a sealant 420.

The antenna unit 100C can be the antenna unit in any of the aforementioned embodiments, such as the antenna unit 100 of FIG. 2B, the antenna unit 100A of FIG. 6, or the antenna unit 100B of FIG. 8B. The antenna units 100C are arrayed in the active region AA and is electrically connected to the corresponding scan lines 212, the corresponding data lines 222 and the corresponding common signal lines 231. For example, the gate electrode of the thin film transistor in the antenna unit 100C is electrically connected to the corresponding scan line 212, the source electrode of the thin film transistor is electrically connected to the corresponding data line 222, and the capacitor electrode is electrically connected to the corresponding common signal line 231. In this embodiment, the common signal line 231 includes a comb-shaped structure, but the present invention is not limited thereto. In other embodiments, the common signal line 231 includes a ring-shaped structure, such as the conductive ring 230 of FIG. 1.

The scan line circuit 210 and the data line circuit 220 are electrically connected to the scan lines 212 and data lines 222 respectively. In this embodiment, connection lines 211 electrically connects the scan lines 212 to the scan line circuit 210. The extending direction of the connection lines 211 is not parallel to the extending direction of the scan lines 212. For example, the extending direction of the connection lines 211 is parallel to the extending direction of the data lines 222.

In some embodiments, the connection lines 211 and the scan lines 212 belong to the same conductive layer, such as the first metal layer. In some embodiments, the connection lines 211 are disposed outside the active region AA.

The chip-on-film package cof is disposed on the first substrate SB1 and is electrically connected to the scan line circuit 210, the data line circuit 220 and the common signal lines 231. The circuit board cb is bonded to the thin film flip-chip package cof.

Figure 11:
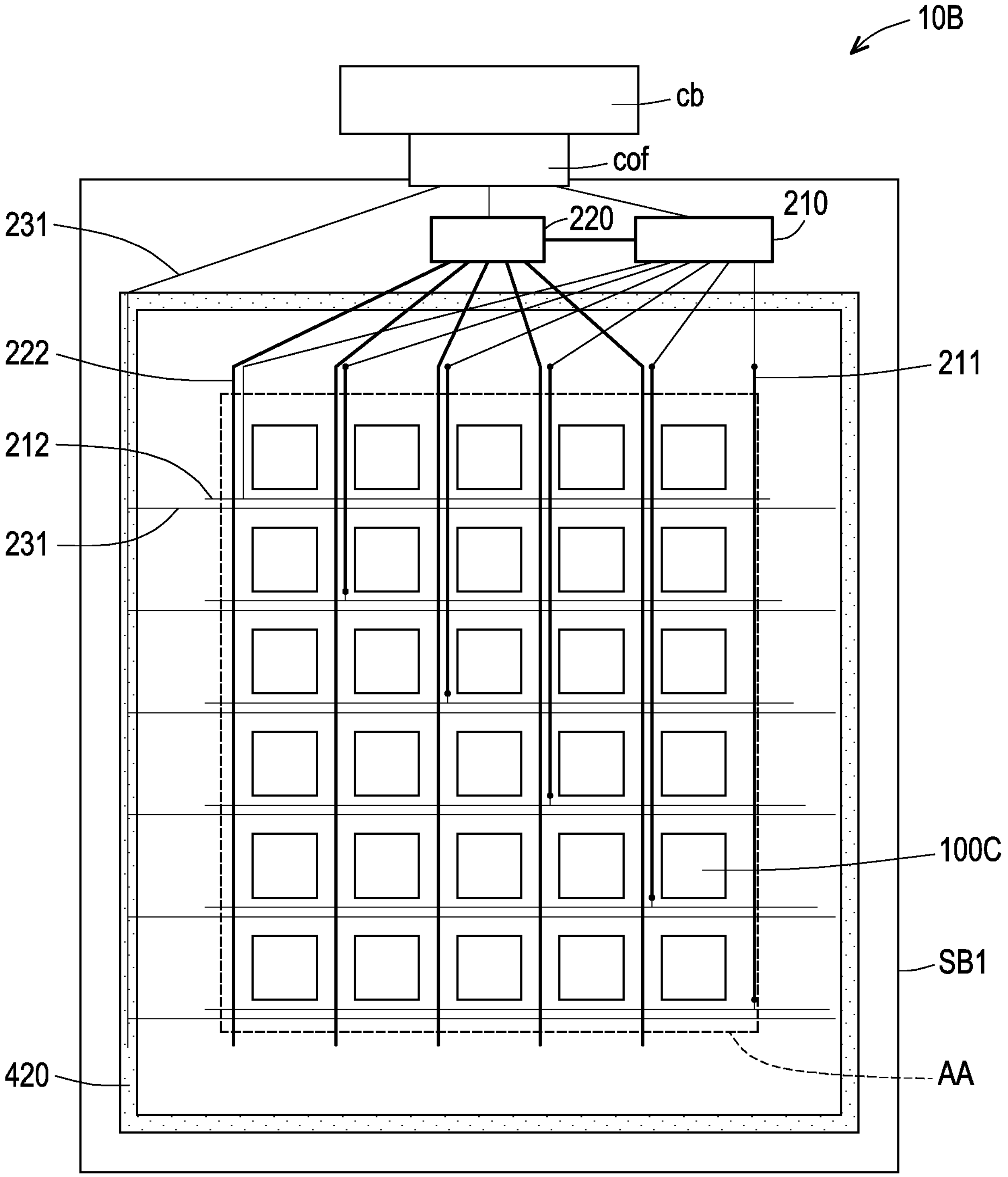
FIG. 11 is a schematic top view of an antenna array substrate according to an embodiment of the present invention.

FIG. 11 is a schematic top view of an antenna array substrate according to an embodiment of the present invention. It should be noted herein that, in embodiments provided in FIG. 11, element numerals and partial content of the embodiments provided in FIG. 10 are followed, the same or similar reference numerals being used to represent the same or similar elements, and description of the same technical content being omitted. For a description of an omitted part, reference may be made to the foregoing embodiment, and the descriptions thereof are omitted herein.

The antenna array substrate 10B in FIG. 11 is similar to the antenna device 10A in FIG. 10. The difference is that in the antenna array substrate 10B, the connection lines 211 and the scan lines 212 belong to different layers, and the connection lines 211 is disposed in the active region AA.

Referring to FIG. 11, in this embodiment, at least a portion of the scan lines 212 are electrically connected to the scan line circuit 210 through the connection line 211. In some embodiments, the scan lines 212 belong to the first metal layer, and the connection lines 211 and the data lines 222 belong to the second metal layer.

In this embodiment, the border width can be reduced by disposing the connection lines 211 in the active region AA.

Figure 12:
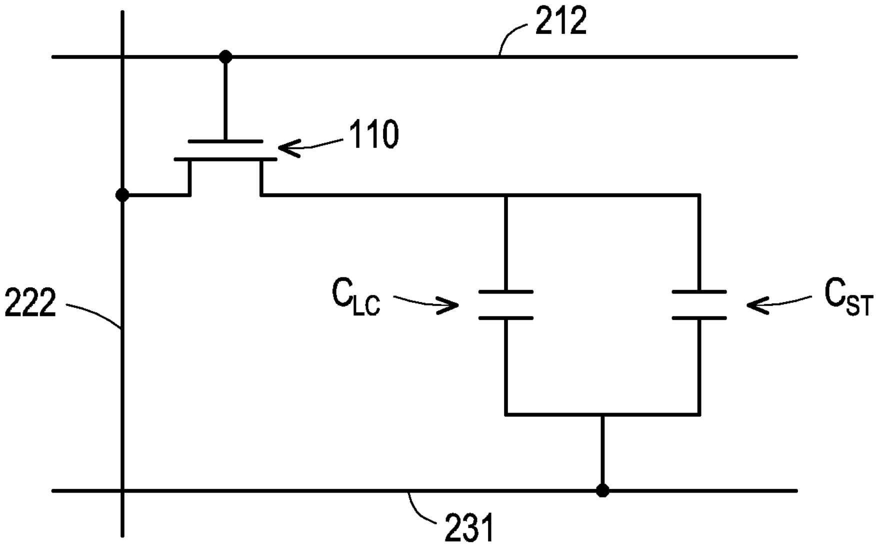
FIG. 12 is a circuit schematic diagram of an antenna unit according to an embodiment of the present invention.

FIG. 12 is a schematic circuit diagram of an antenna unit according to an embodiment of the present invention. Referring to FIGS. 3A and 12, the thin film transistor 110 of the antenna unit 100 may be used to drive the liquid crystal molecular in the liquid crystal layer LC. Specifically, the scan line 212 provides a signal to the gate electrode 112 of the thin film transistor 110 to control the switching of the thin film transistor 110. The sata line 222 provides a signal to the first antenna electrode 140 when thin film transistor 110 is on-state. In this embodiment, the second antenna electrode 170, the third antenna electrode 180 and the capacitor electrode 120 are both electrically connected to the common signal line 231 (or the conductive ring 230 in FIG. 1). The liquid crystal capacitor $C_{LC}$ is included between the first antenna electrode 140 and the second antenna electrode 170, and the storage capacitor $C_{ST}$ is included between the second source/drain electrode 118 and the capacitor electrode 120.

Figure 13A:
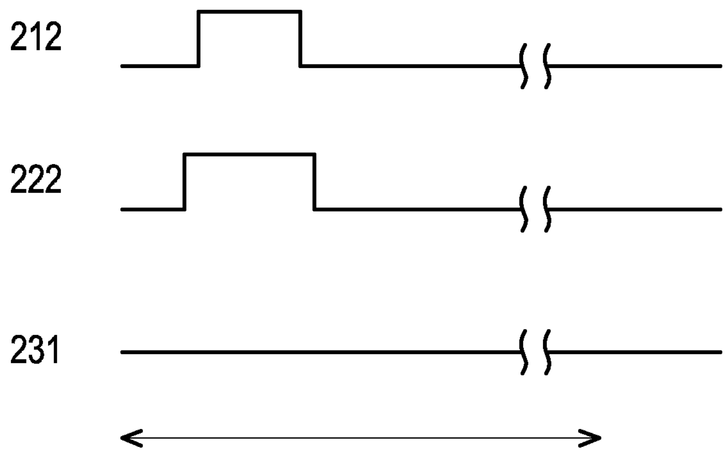
FIG. 13A is a signal diagram of a driving method of an antenna unit according to an embodiment of the present invention.
Figure 13B:
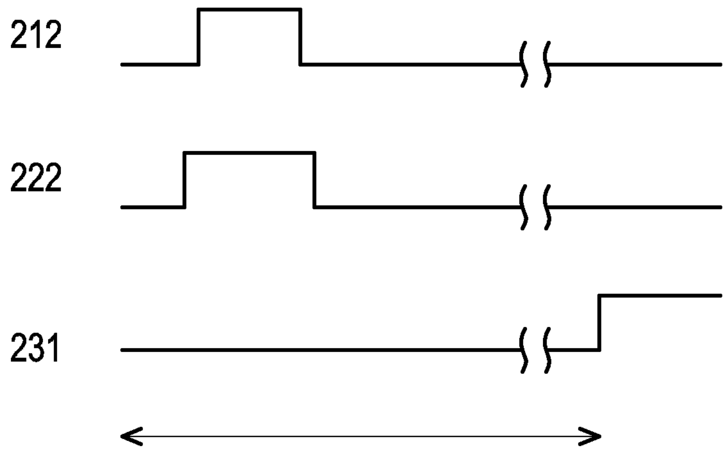
FIG. 13B is a signal diagram of a driving method of another antenna unit according to an embodiment of the present invention.

The voltage signal applied by the common signal line 231, the second antenna electrode 170, the third antenna electrode 180 and the capacitor electrode 120 may be a DC voltage signal (as shown in FIG. 13A) or an AC voltage signal (as shown in FIG. 13B).

As shown in FIG. 13A, when the common signal line 231 is operated using a DC voltage, the voltage on the common signal line 231 is, for example, but not limited to, 8V. The scan line 212 is, for example, but not limited to, operated between −8V and 25V, and the data line 222 is, for example, but not limited to, operated between 0V and 16V. The double headed arrow in FIG. 13A is used to indicate the range of one frame.

As shown in FIG. 13B, when the common signal line 231 is operated using AC voltage, the common signal line 231 is, for example, but not limited to, operated between 8V and 0V. The scan line 212 is, for example, but not limited to, operated between −10V and 15V. The data line 222 is, for example, but not limited to, operated between 0V and 8V. The double headed arrow in FIG. 13B is used to indicate the range of one frame.

Figure 14:
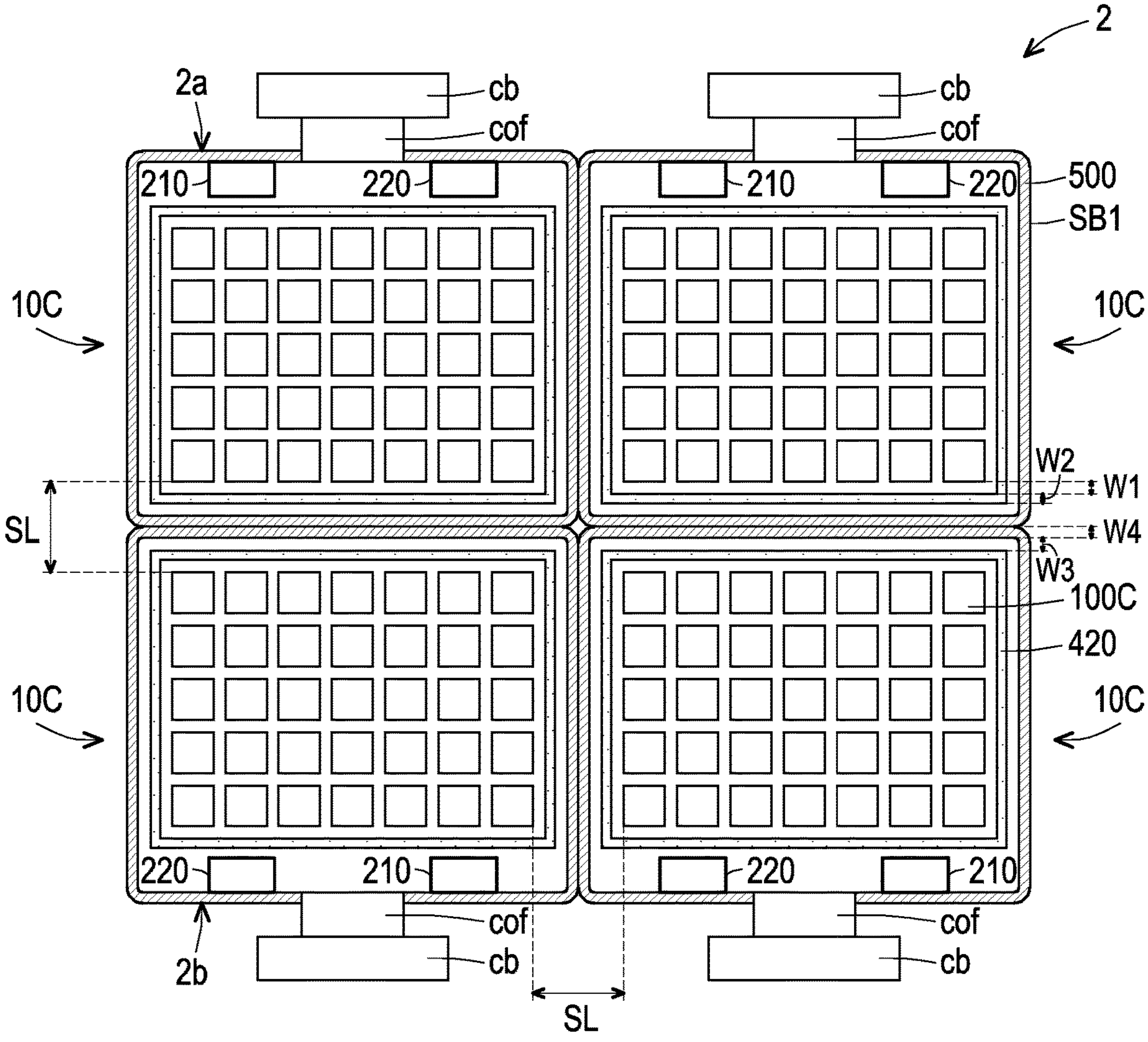
FIG. 14 is a schematic top view of an antenna device according to an embodiment of the present invention.

FIG. 14 is a schematic top view of an antenna device 2 according to an embodiment of the present invention. In this embodiment, the antenna device 2 includes a plurality of antenna array substrates 10C spliced together. The Antenna array substrate 10C includes antenna units 100C, the antenna units 100C can be the antenna units in any of the aforementioned embodiments, such as the antenna unit 100 in FIG. 2B, the antenna unit 100A in FIG. 6, or the antenna unit 100B in FIG. 8B. The scan line circuit 210 is electrically connected to the antenna units 100C through the scan lines, and the data line circuit 220 is electrically connected to the antenna units 100C through the data lines. The arrangement of the scan lines and data lines may refer to the antenna array substrate 10A of FIG. 10 or the antenna array substrate 10B of FIG. 11, and will not be described again.

The antenna array substrates 10C are disposed in cases 500, and the cases 500 are assembled together. In some embodiments, the chip-on-film packages cof and the circuit board cb can be disposed inside the cases 500 or outside the cases 500. In some embodiments, the cases 500 are components that includes reflection plates. In some embodiments, the pitch of the antenna units 100C in one antenna array substrate 10C is 2 millimeters to 10.8 millimeters.

In this embodiment, the shortest distance SL between the antenna units 100C of two adjacent antenna array substrates 10C includes the wiring width W1 (for example, 1,000 micrometers to 20,000 micrometers) of the underlying signal lines (such as the scan lines 212 and the data lines 222 in FIG. 2A), a width W2 (such as 300 micrometers to 2,000 micrometers) of the sealant 420, a width W3 (such as 200 micrometers to 1,500 micrometers) of a cutting reserved area, and a thickness W4 (such as 200 micrometers to 2,000 micrometers) of the case 500. In some embodiments, the underlying signal lines may overlap the antenna units 100C, and the sealant 420, the cutting reserved area and the case 500 may be omitted. In other words, the shortest distance SL is at least 0. In a preferred embodiment, the shortest distance SL between the antenna units 100C of two adjacent antenna array substrates 10C is 0 millimeters to 5.4 millimeters, thereby reducing the generation of lateral leaky-wave. In some embodiments, the shortest distance SL is $0\lambda_0 \sim 0.5\lambda_0$, wherein $\lambda_0$ is the wavelength of the wireless signal to be received or transmitted in the air, thereby reducing the generation of lateral leaky-wave.

In this embodiment, the chip-on-film package of each antenna array substrate 10C is disposed on the first substrate SB1, the chip-on-film packages cof in a portion the antenna array substrates 10C are disposed on the first side 2*a* of the antenna device 2, and the chip-on-film packages cof of another portion of the antenna array substrates 10C are disposed on the second side 2*b* of the antenna device 2.

Figure 16:
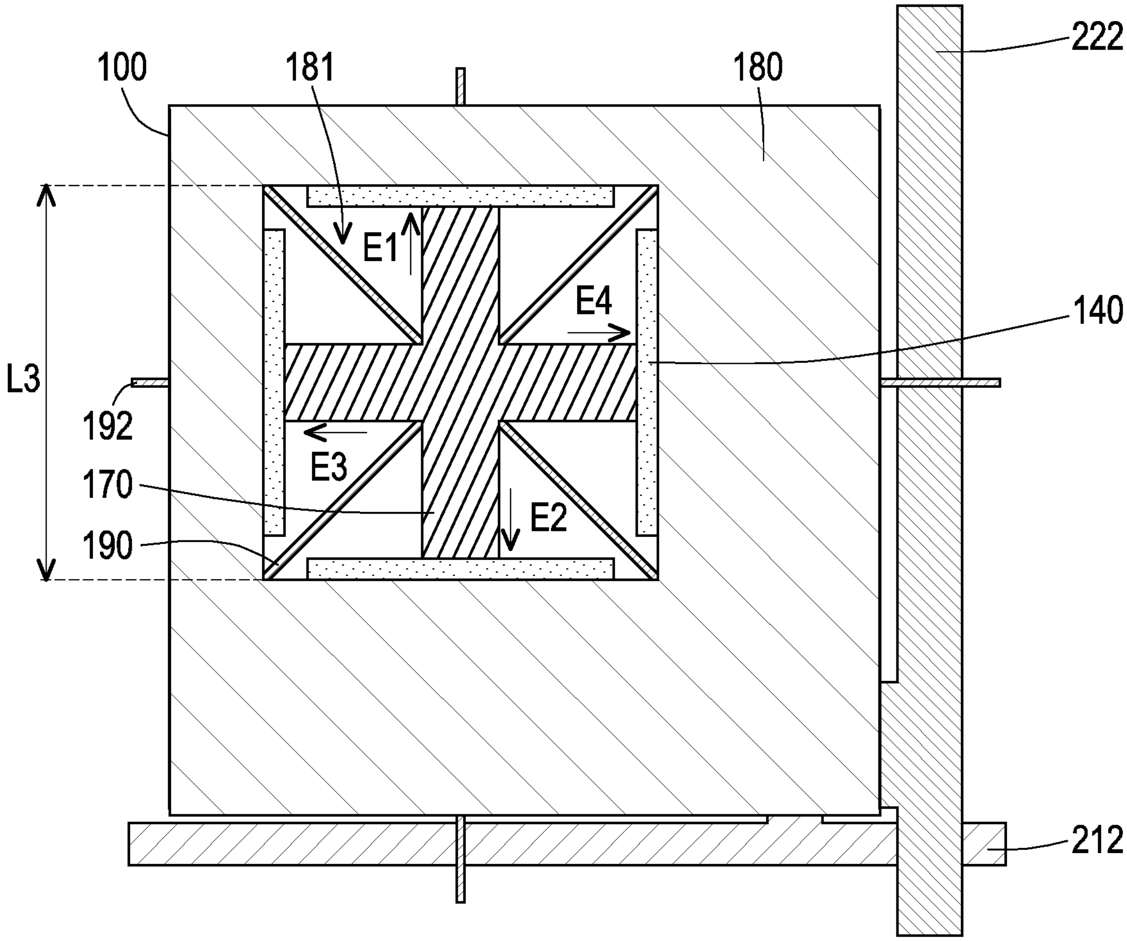
FIG. 16 is a schematic top view of an antenna unit according to an embodiment of the present invention.

FIG. 16 is a schematic top view of an antenna unit according to an embodiment of the present invention. It should be noted herein that, in embodiments provided in FIG. 16, element numerals and partial content of the embodiments provided in FIGS. 1 to 3B are followed, the same or similar reference numerals being used to represent the same or similar elements, and description of the same technical content being omitted. For a description of an omitted part, reference may be made to the foregoing embodiment, and the descriptions thereof are omitted herein.

The main difference between the embodiment of FIG. 16 and the embodiments of FIGS. 1 to 3B is that in the antenna unit of FIGS. 1 to 3B, the second antenna electrode 170 is a ring-shaped cross. However, in the antenna unit of FIG. 16, the second antenna electrode 170 is a solid cross.

In addition, in this embodiment, the second connection lines 190 connect from the four corners of the first opening 181 of the third antenna electrode 180 to the corners near the cross position of the cross-shaped second antenna electrode 170. Through this setting, the frequency of the antenna signal can be adjusted by changing the electrical impedance of the second connection lines 190. For example, when the second connection lines 190 include high electrical impedance materials (such as indium tin oxide, thin metal or other similar materials), the antenna signal is not easy to transmit on the second connection lines 190, making the antenna signal tend to be a low-frequency signal. On the other hand, when the second connection lines 190 include low electrical impedance materials (such as thick metal or other similar materials), the antenna signal is easy to transmit on the second connection line 190, making the antenna signal tend to be a high-frequency signal. In other words, through the setting of such second connection lines 190, the antenna unit can be matched to different frequency antenna signals by adjusting the material or thickness of the second connection lines 190.

To sum up, the antenna unit proposed by the present invention has the effect of dual-linear polarization, and has the advantages of high phase modulation and high reflection intensity for the radiation signal.

What is claimed is:

1. An antenna device, comprising:
an antenna array substrate, comprising:
a first substrate;
a second substrate;
a liquid crystal layer, located between the first substrate and the second substrate; and
a plurality of antenna units, wherein each of the plurality of antenna units comprises:
at least four first antenna electrodes, separated from each other and located above a first side of the first substrate near the liquid crystal layer;
a second antenna electrode, located above a first side of the second substrate near the liquid crystal layer, wherein the second antenna electrode is partially overlapping with the at least four first electrodes in a normal direction of a top surface of the second substrate; and
a third antenna electrode, located above the first side of the second substrate near the liquid crystal layer, wherein the third antenna electrode and the second antenna electrode are disposed in a same layer, the third antenna electrode has a first opening, and the second antenna electrode is located within the first opening.

2. The antenna device of claim 1, wherein each of the plurality of antenna units further comprises:
a reflection electrode, disposed on a second side of the first substrate away from the second substrate.

3. The antenna device of claim 2, wherein there is a gap layer between the reflection electrode and the first substrate.

4. The antenna device of claim 1, wherein each of the plurality of antenna units further comprises:
a thin film transistor;
a first connection line, electrically connected to the thin film transistor and the at least four first antenna electrodes; and
a capacitor, electrically connected to the thin film transistor and the at least four first antenna electrodes.

5. The antenna device of claim 4, wherein the first connection line is extending from one of the at least four first antenna electrodes along an extending direction, and an angle between the extending direction and a normal direction of a sidewall of the one of the at least four first antenna electrodes is θ, and θ is greater than or equal to 0 degrees and less than 60 degrees.

6. The antenna device of claim 4, wherein the at least four first antenna electrodes have a first thickness, and the first connection line has a second thickness, and a ratio of the second thickness to the first thickness is $\frac{1}{2}$ to $\frac{1}{100}$.

7. The antenna device of claim 1, comprising a plurality of antenna array substrates, wherein one of the plurality of antenna array substrates is adjacent to another one of the plurality of antenna array substrates, and a minimum distance between the one of the plurality of antenna array substrates and the another one of the plurality of antenna array substrates is 0 to 5.4 mm.

8. The antenna device of claim 1, wherein the second antenna electrode comprises a cross-shaped ring.

9. The antenna device of claim 8, wherein the second antenna electrode comprises:

a first portion, extending from a central connection area of the second antenna electrode along a first extending direction;

a second portion, extending from the central connection area of the second antenna electrode along a second extending direction opposite to the first extending direction;

a third portion, extending from the central connection area of the second antenna electrode along a third extending direction, wherein the third extending direction is perpendicular to the first extending direction and the second extending direction;

a fourth portion, extending from the central connection area of the second antenna electrode along a fourth extending direction opposite to the third extending direction, wherein the first portion, the second portion, the third portion, and the fourth portion are connected together.

10. The antenna device of claim 1, wherein each of the plurality of antenna units further comprises:

a plurality of second connection lines, electrically connected to the third antenna electrode and the second antenna electrode; and wherein the antenna array substrate further comprises:

a conductive ring surrounding the plurality of antenna units and electrically connected to the third antenna electrode.

11. The antenna device of claim 1, wherein the first portion is partially overlapping with a protruding portion of one of the at least four first antenna electrodes in the normal direction of the top surface of the second substrate, wherein the at least four first antenna electrodes are four first antenna electrodes, and the four first antenna electrodes are disposed corresponding to four sides of the first opening, respectively.

12. The antenna device of claim 11, wherein each of the four first antenna electrodes comprises a main portion and the protruding portion, wherein the protruding portion has a first length, and the main portion has a second length, the second length is greater than the first length, and one of the four sides of the first opening has a third length, and a ratio of the second length to the third length is ⅛ to ¾.

13. The antenna device of claim 1, wherein the at least four first antenna electrodes are four first antenna electrodes, and the four first antenna electrodes are disposed corresponding to four corners of the first opening, respectively.

14. The antenna device of claim 13, wherein each of the four first antenna electrodes is partially overlapping with a corresponding one of the first portion and the second portion and a corresponding one of the third portion and the fourth portion.

15. The antenna device of claim 13, wherein each of the four first antenna electrodes is L-shaped.

16. The antenna device of claim 1, wherein the antenna array substrate further comprises:

a buffer layer, located between the second antenna electrode and the second substrate, wherein a thickness of the buffer layer is ⅓to⅕of a thickness of the second antenna electrode.

17. The antenna device of claim 1, wherein the second antenna electrode has a 90 degrees rotational symmetry.

18. The antenna device of claim 1, wherein the second antenna electrode is annulus-shaped.

19. An antenna device comprising:

a plurality of antenna array substrates, and each of the plurality of antenna array substrates comprising:

a first substrate;

a second substrate;

a liquid crystal layer, located between the first substrate and the second substrate; and a plurality of antenna units, wherein each of the plurality of antenna units comprises:

at least four first antenna electrodes, separated from each other and located above a first side of the first substrate near the liquid crystal layer;

a second antenna electrode, located above a first side of the second substrate near the liquid crystal layer, wherein the second antenna electrode is partially overlapping with the at least four first electrodes in a normal direction of a top surface of the second substrate; and a chip on film package, disposed above the first substrate, wherein the chip on film package of one of the plurality of antenna array substrates is disposed at a first side of the antenna device and the chip on film package of another one of the plurality of antenna array substrates is disposed at a second side of the antenna device opposite to the first side of the antenna device.

* * * * *